(12) United States Patent
Ghorpade et al.

(10) Patent No.: US 10,755,508 B2
(45) Date of Patent: Aug. 25, 2020

(54) METHOD AND SYSTEM FOR ACCESS CONTROL

(71) Applicant: MasterCard International Incorporated, Purchase, NY (US)

(72) Inventors: Krupal Ghorpade, Maharashtra (IN); Vijendra Pratap Singh, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 5 days.

(21) Appl. No.: 15/693,332

(22) Filed: Aug. 31, 2017

(65) Prior Publication Data
US 2018/0061155 A1 Mar. 1, 2018

(30) Foreign Application Priority Data
Sep. 1, 2016 (SG) .......................... 10201607277V

(51) Int. Cl.
*G07C 9/00* (2020.01)
*G07C 9/25* (2020.01)
(Continued)

(52) U.S. Cl.
CPC .......... *G07C 9/25* (2020.01); *G06Q 20/3224* (2013.01); *G06Q 20/3274* (2013.01);
(Continued)

(58) Field of Classification Search
CPC .......... G07C 2009/00198; G07C 2009/00341; G07C 2009/00777; G07C 2009/00865; G07C 9/00182; G07C 9/00309; G07C 9/00571; G07C 9/00722; G07C 9/00857; G07C 9/00904; G07C 2209/08; G07C 2209/63; G07C 9/00126; G07C 9/00563; G07C 2009/00769; G07C 9/00071; G07C 9/00087; G07C 9/00103; G07C 9/00119; G07C 9/00817; G07C 9/00944; G07C 9/37; G07C 9/215; G07C 9/257; G07C 9/26;
(Continued)

(56) References Cited

U.S. PATENT DOCUMENTS 9,478,084 B1 * 10/2016 Robinson ........... G07C 9/00904
9,613,190 B2 * 4/2017 Ford ....................... G06F 21/10
(Continued)

*Primary Examiner* — Dionne Pendleton

(57) ABSTRACT

The present disclosure generally relates to a computerized method comprising: communicating access details of the facility from the mobile device to the facility for a first authentication process, the mobile device located in the vicinity of the facility initially in a secured state for preventing access thereto; receiving a request notification on the mobile device in response to positive authentication of the access details from the first authentication process, the request notification comprising a request for biometric data of the user; receiving an input of the biometric data on the mobile device; and communicating the biometric data from the mobile device to a host server for a second authentication process, wherein the facility is configured to change from the secured state to an unsecured state in response to positive authentication of the biometric data from the second authentication process, thereby providing, to the user, access to the facility.

20 Claims, 11 Drawing Sheets

(51) Int. Cl.
*G07C 9/37* (2020.01)
*G07C 9/20* (2020.01)
*G06Q 20/32* (2012.01)
*G07C 9/26* (2020.01)

(52) U.S. Cl.
CPC ..... *G07C 9/00309* (2013.01); *G07C 9/00563* (2013.01); *G07C 9/00571* (2013.01); *G07C 9/215* (2020.01); *G07C 9/26* (2020.01); *G07C 9/37* (2020.01); *G07C 9/257* (2020.01); *G07C 2009/00769* (2013.01)

(58) Field of Classification Search
CPC .............. G07C 9/00428; H04B 5/0056; H04L 63/0853; H04L 63/0861; H04L 2463/101; H04L 63/0428; H04L 63/061; H04L 63/083; H04L 63/101; H04L 63/0876; H04L 63/107; G06F 21/10; G06F 21/602; G06F 21/62; G06F 2221/0728; G06K 7/08; G06K 7/087; G06K 9/00087; G06K 9/00979; G06K 19/145; G06K 19/06206; G06Q 20/341; G06Q 20/40; G06Q 20/40145; G06Q 20/409; G06Q 20/4093; G06Q 30/00; G06Q 20/0855; G06Q 20/12; G06Q 20/227; G06Q 20/3224; G06Q 20/363; G06Q 30/0611; E05B 15/1607; E05B 17/0083; E05B 17/0091; E05B 17/10; E05B 2045/0635; E05B 2047/0058; E05B 2047/0062; E05B 2047/0064; E05B 2047/0067; E05B 2047/0068; E05B 2047/0069; E05B 2047/0091; E05B 2047/0095; E05B 39/00; E05B 45/06; E05B 47/0012; E05B 47/0038; H04W 4/021; H04W 12/0053; H04W 12/06; H04W 12/08; H04W 4/029; H04W 4/33; H04W 4/70; H04W 4/80; G07B 11/00; G07B 15/00; G07B 15/02; G05B 19/0426; G05B 19/056; G05B 2219/13004; G05B 2219/23406; G08G 1/142; G08G 1/146; G08G 1/149; H04N 7/186; H04N 7/188; H04N 9/3179; H04N 9/3194; H05K 13/00; Y10S 707/99939; Y10S 901/01; A41B 3/06; A45C 11/182; A47K 10/025; A47K 10/24; A61B 5/0077; A61B 5/1032; A61B 5/441; A61B 5/442; A61B 5/443; A61B 5/448; A61B 5/7275; A61Q 17/04; A61Q 19/004; B25J 9/0006; B25J 9/16; B25J 9/1697; B26F 1/32; B26F 2001/365; B42D 1/006; B42D 1/007; B42F 21/12; B60W 2540/28; B60W 40/09; B64C 2201/108; B64C 2201/128; B64C 2201/146; B64C 2201/182; B64C 39/024; B64C 39/026; B64F 1/222; E05C 19/16; E05C 1/08; E05C 15/60; E05C 15/73; E05C 15/74; E05C 15/77; E05C 2015/763; E05C 2015/765; G01C 21/3679; G06T 19/006; G06T 2207/10024; G06T 2207/30088; G06T 7/0012; G08C 17/02; G10L 13/02; G10L 15/20; G11C 16/0483; G11C 16/14; G11C 16/26; G11C 16/32; G11C 16/3431; G16H 40/63; G16H 50/30; H01Q 13/18; H01Q 1/2208; H01Q 21/28; H01Q 25/005; H01Q 3/24; H01Q 3/247; H01Q 9/0407; H02J 7/0042; H04K 1/02; H04K 2203/34; H04K 3/43; H04K 3/68; H04K 3/825; Y02D 70/00; Y02D 70/22; Y02T 10/7005; Y02T 10/7072; Y02T 90/121; Y02T 90/128; Y02T 90/14; Y02T 90/163; Y02T 90/169; Y04S 10/54; Y04S 30/14; Y04S 40/18

See application file for complete search history.

(56) References Cited

U.S. PATENT DOCUMENTS

| | | | | |
|---|---|---|---|---|
| 10,347,063 | B1* | 7/2019 | LaRovere | G07C 1/32 |
| 2002/0123325 | A1* | 9/2002 | Cooper | H04L 63/0492 |
| | | | | 455/411 |
| 2010/0328025 | A1* | 12/2010 | Razdan | G06Q 10/02 |
| | | | | 340/5.7 |
| 2012/0265585 | A1* | 10/2012 | Muirbrook | G06Q 30/0633 |
| | | | | 705/13 |
| 2016/0277396 | A1* | 9/2016 | Gardiner | G06K 9/00087 |
| 2017/0352213 | A1* | 12/2017 | Bowie | G06K 7/087 |
| 2018/0054509 | A1* | 2/2018 | Nuescheler | H04M 1/72569 |
| 2018/0232718 | A1* | 8/2018 | Brown | G06Q 20/227 |

* cited by examiner

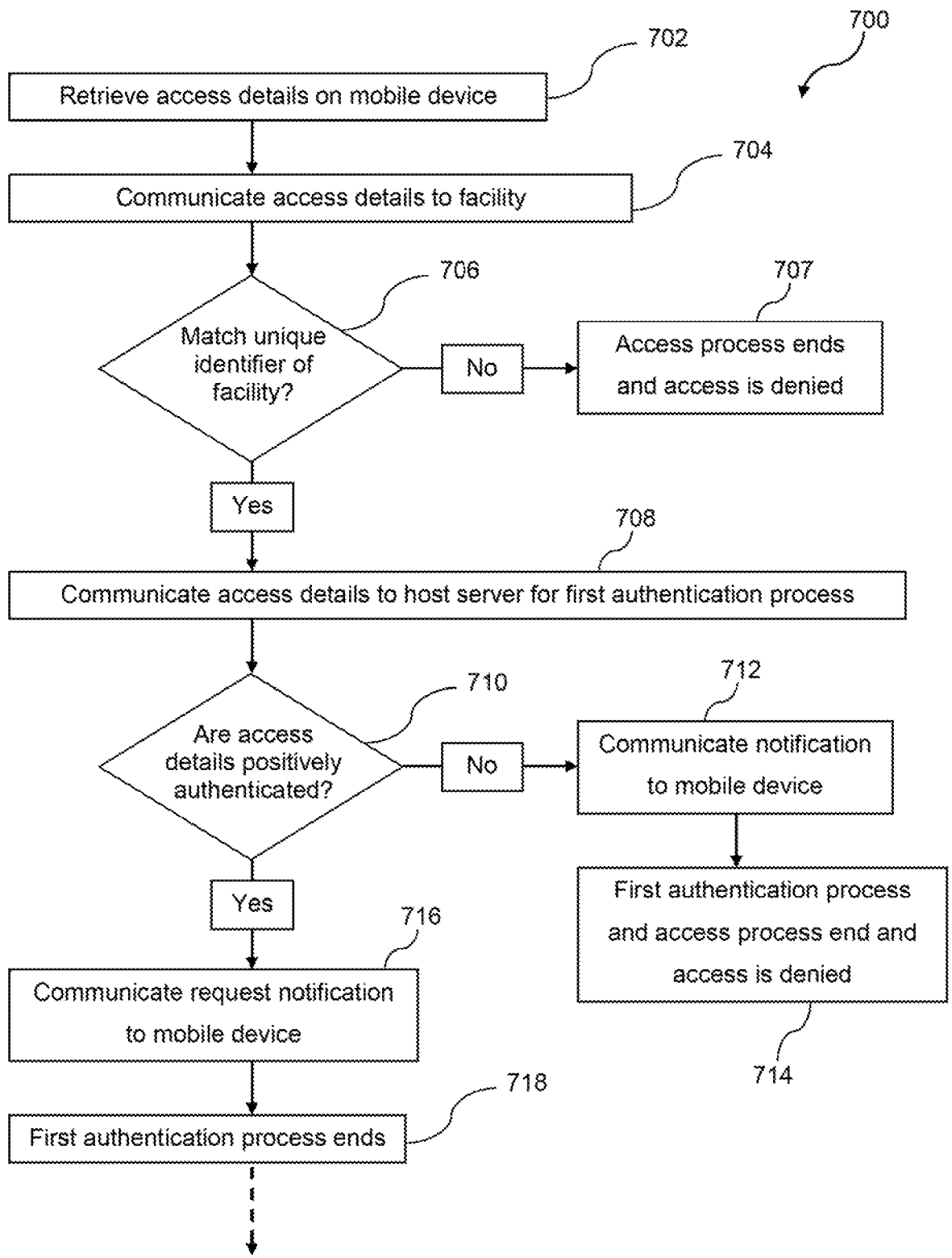
FIG. 8A (continued in FIG. 8B)

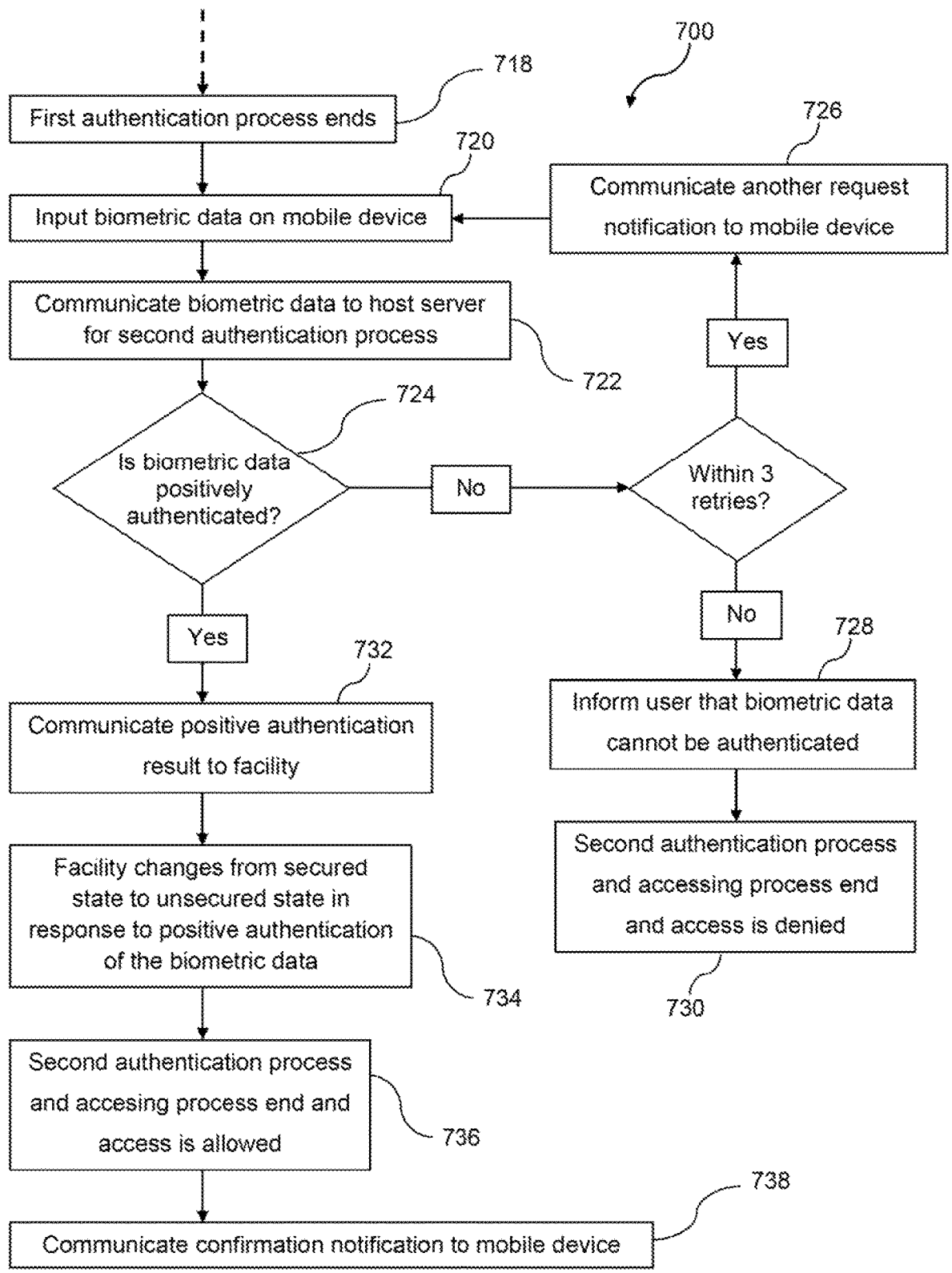
FIG. 8B (continued from FIG. 8A)

METHOD AND SYSTEM FOR ACCESS CONTROL

CROSS-REFERENCE TO RELATED APPLICATIONS

This application claims the benefit of priority of Singapore Patent Application No. 10201607277V, filed 1 Sep. 2016, which is incorporated by reference herein in its entirety.

TECHNICAL FIELD

The present disclosure generally relates to a method and system for access control. More particularly, the present disclosure describes various embodiments of a method and system for controlling access to a facility, such that unauthorized or unauthenticated users/customers/guests are prevented from gaining access to the facility.

BACKGROUND

In the present disclosure, a facility may be defined as a place, amenity, or piece of equipment provided for a particular purpose. For example, a facility may be a hospitality facility/venue/location which a user can access, occupy, and use. Hospitality facilities/venues/locations may include, but are not limited to, hotels/hotel rooms, accommodation/lodging rooms, and conference or meeting venues. A facility may also be an article or equipment which the user can access to use or operate. The equipment may include, but is not limited to, rental vehicles, storage lockers, safe deposit boxes, and computer/electronic devices/machines. Notably, in some instances access is controlled by a physical lock, and in other instances access is controlled by a virtual lock (e.g. preventing access to a website or application).

In one example, the facility may be a hotel or a hotel room, whereby conventionally, users/customers/guests who are checking into the hotel have to go to the hotel reception to complete some formalities procedures. These procedures are typically required by the hotel to verify the identity of the customer, e.g. by making a copy of his/her (and accompanying guest(s), if any) passport(s). The hotel staff will then check their hotel database for the room allocated to the customer. A digital key card will then be issued to the customer. The digital key card may begin from a blank card which is programmed to enable access/entry into the allocated hotel room. The customer can only use the programmed digital key card to access his/her allocated hotel room. Multiple key cards may also be programmed in the same way and issued if the customer so requires.

One problem associated with this conventional way of checking into hotels is that time may be wasted at the hotel reception while waiting for hotel staff to complete the formalities procedures, program and issue the digital key cards. During peak seasons, there may be large groups of tourists queuing for the hotel reception, adding to the time required between stepping into the hotel premises and receiving the key card to the customer's allocated hotel room.

Another problem is that there is a risk of the customer losing his/her key card. Loss of the key card causes the customer to be locked out. The customer may also have to undergo complex procedures in order to have a new key card re-issued by the hotel. There is also a risk of outsiders or impersonators with maligned intention unlocking and entering into the customer's room with the lost key card, which may further result in them stealing and absconding away with the customer's valuables.

In another example, the facility may be a rental vehicle which a user (e.g. tourist) has booked for a road trip. The rental vehicle is located at a car park or a parking garage. Typically, the user would have to approach an office area or reception area near the car park to complete some formalities procedures, similar to those for checking into a hotel. A staff in the reception area would then give the user a set of car keys and the user can proceed to the rental vehicle and drive off. Even though there are newer vehicle or car models that operate on keyless access or entry systems, the user still has to approach the reception area to complete the formalities procedures, before getting the keys for the rental vehicle. Similar to the hotel, this process can be time and manpower consuming.

Therefore, in order to address or alleviate at least one of the aforementioned problems and/or disadvantages, there is a need to provide a method and system for controlling access to a facility, in which there is at least one improved feature over the aforementioned prior art.

SUMMARY

According to a first aspect of the present disclosure, there is a computerized method implemented on a mobile device of a user for controlling access to a facility, a system implementing the method, and a non-transitory computer-readable medium storing computer-readable instructions that, when executed, cause a processor to perform steps of the method. The method comprises: communicating access details of the facility from the mobile device to the facility for a first authentication process, the mobile device located in the vicinity of the facility initially in a secured state for preventing access thereto; receiving a request notification on the mobile device in response to positive authentication of the access details from the first authentication process, the request notification comprising a request for biometric data of the user; receiving an input of the biometric data on the mobile device; and communicating the biometric data from the mobile device to a host server for a second authentication process, wherein the facility is configured to change from the secured state to an unsecured state in response to positive authentication of the biometric data from the second authentication process, thereby providing, to the user, access to the facility.

According to a second aspect of the present disclosure, there is computerized method implemented on a host server for controlling access to a facility, a system implementing the method, and a non-transitory computer-readable medium storing computer-readable instructions that, when executed, cause a processor to perform steps of the method. The method comprises: receiving access details of the facility from the facility, the access details communicated from a mobile device of a user to the facility, the mobile device located in the vicinity of the facility initially in a secured state for preventing access thereto; authenticating the access details in a first authentication process; communicating a request notification to the mobile device in response to positive authentication of the access details from the first authentication process, the request notification comprising a request for biometric data of the user; receiving the biometric data inputted via the mobile device; authenticating the biometric data in a second authentication process; and changing the facility from the secured state to an unsecured state in response to positive authentication of the biometric data from the second authentication process, thereby providing, to the user, access to the facility.

An advantage of the above aspects of the present disclosure is that the user can make use of the mobile device, together with the host server and client server, to directly gain access to the facility, e.g. hotel room or rental vehicle, bypassing the time-consuming procedures at the reception area. Moreover, the use of two-factor authentication (2FA) (access details and biometric data) to control access to the facility provides stronger authentication, keeping the facility more secure. Therefore, aspects of the present disclosure provide improved access control and also a more secure and quicker way of providing, to the user, access to the facility.

A method and system for controlling access to a facility according to the present disclosure is thus disclosed herein. Various features, aspects, and advantages of the present disclosure will become more apparent from the following detailed description of the embodiments of the present disclosure, by way of non-limiting examples only, along with the accompanying drawings.

BRIEF DESCRIPTION OF THE DRAWINGS

FIG. 8A and FIG. 8B are illustrations of an accessing process in a method for controlling access to a facility, in accordance with an embodiment of the present disclosure.

DETAILED DESCRIPTION

Figure 1:
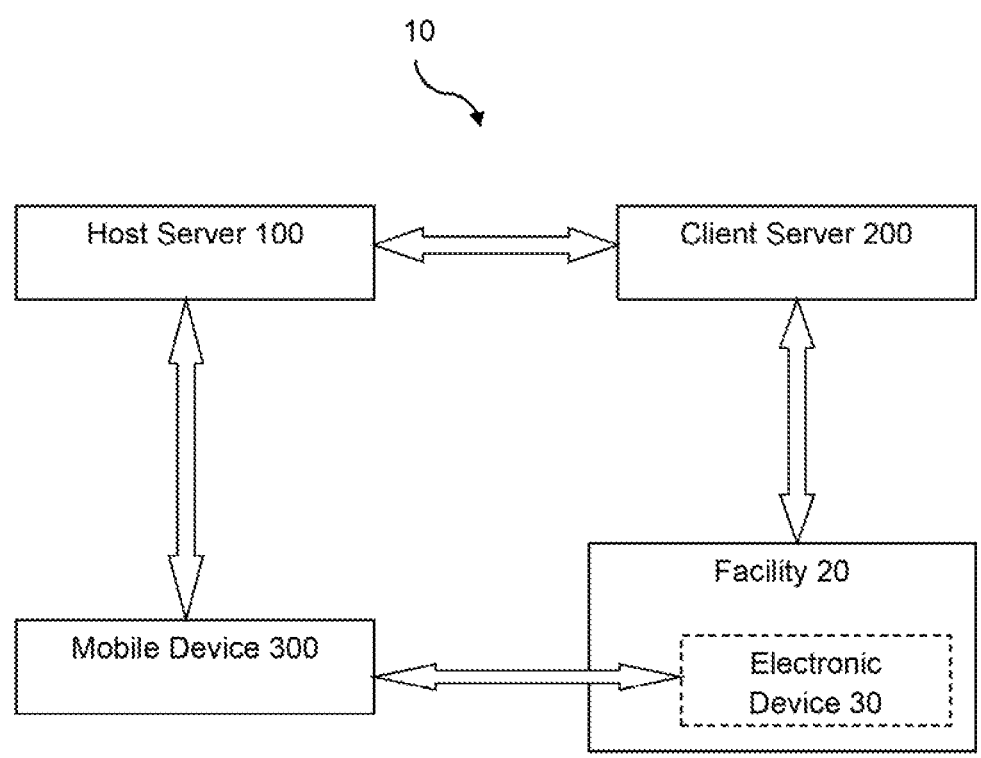
FIG. 1 is an illustration of a system for implementation of a method for controlling access to a facility, in accordance with an embodiment of the present disclosure.

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated. As used herein, the term "set" corresponds to or is defined as a non-empty finite organization of elements that mathematically exhibits a cardinality of at least one (i.e., a set as defined herein can correspond to a unit, singlet, or single element set, or a multiple element set), in accordance with known mathematical definitions. The recitation of a particular numerical value or value range herein is understood to include or be a recitation of an approximate numerical value or value range.

For purposes of brevity and clarity, descriptions of embodiments of the present disclosure are directed to a method and system for controlling access to a facility, in accordance with the drawings in FIG. 1 to FIG. 9C. As described above, a facility may be defined as a place, amenity, or piece of equipment provided for a particular purpose. For example, a facility may be a hospitality facility/venue/location which a user can access, occupy, and use. Hospitality facilities/venues/locations may include, but are not limited to, hotels/hotel rooms, accommodation/lodging rooms, and exhibition/conference/meeting venues. A facility may also be an article or equipment which the user can access to use or operate. The equipment may include, but are not limited to, rental vehicles, storage lockers, safe deposit boxes, and computer/electronic devices/machines. While not expressly described herein for purpose of brevity, it should be appreciated that the method and system of the present disclosure may be extended to and for use in other facilities, such as residences, dormitories, gateways, lifts/elevators, secure locations or private locations that require security measures, travel-related facilities (e.g. airport boarding gates, coaches, trains, etc.), or electronic access gates or devices. Aspects of the present disclosure may be applied to physical access control access and to virtual access control (e.g. for entry/access to a website or application).

While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

In representative or exemplary embodiments of the present disclosure, there is provided a system 10 as illustrated in FIG. 1. The system 10 comprises a host server 100 having a processor and a memory configured to store computer-readable instructions, and further comprises a client server 200 for managing a facility 20, the client server 200 being communicatively linked to the host server 100. Particularly, the client server 200 is communicatively integrated with the facility 20 for controlling and managing operations of the facility 20. The client server 200 may be located at or near the premises or site of the facility 20 or remotely away from the facility 20.

The facility 20 may be secured or locked with an electronic device 30. The electronic device 30 may be an electronic or digital lock for maintaining the facility 20 in the secured/locked/inaccessible state. The electronic device 30 thus prevents people without the proper key to deactivate the electronic device 30 and gain access to the facility 20. The electronic device 30 may be designed to read data from an external input in order to deactivate itself to unsecure/unlock/release the facility 20 so that the user may be able to access the facility 20 and use it. The client server 200 is communicatively linked to the electronic device 30 such that controls and operations of the electronic device 30 may be performed by or via the client server 200 and/or the host server 100 which is also communicatively linked to the client server 200. Accordingly, the system 10 is configured for controlling access to the facility 20.

Figure 2:
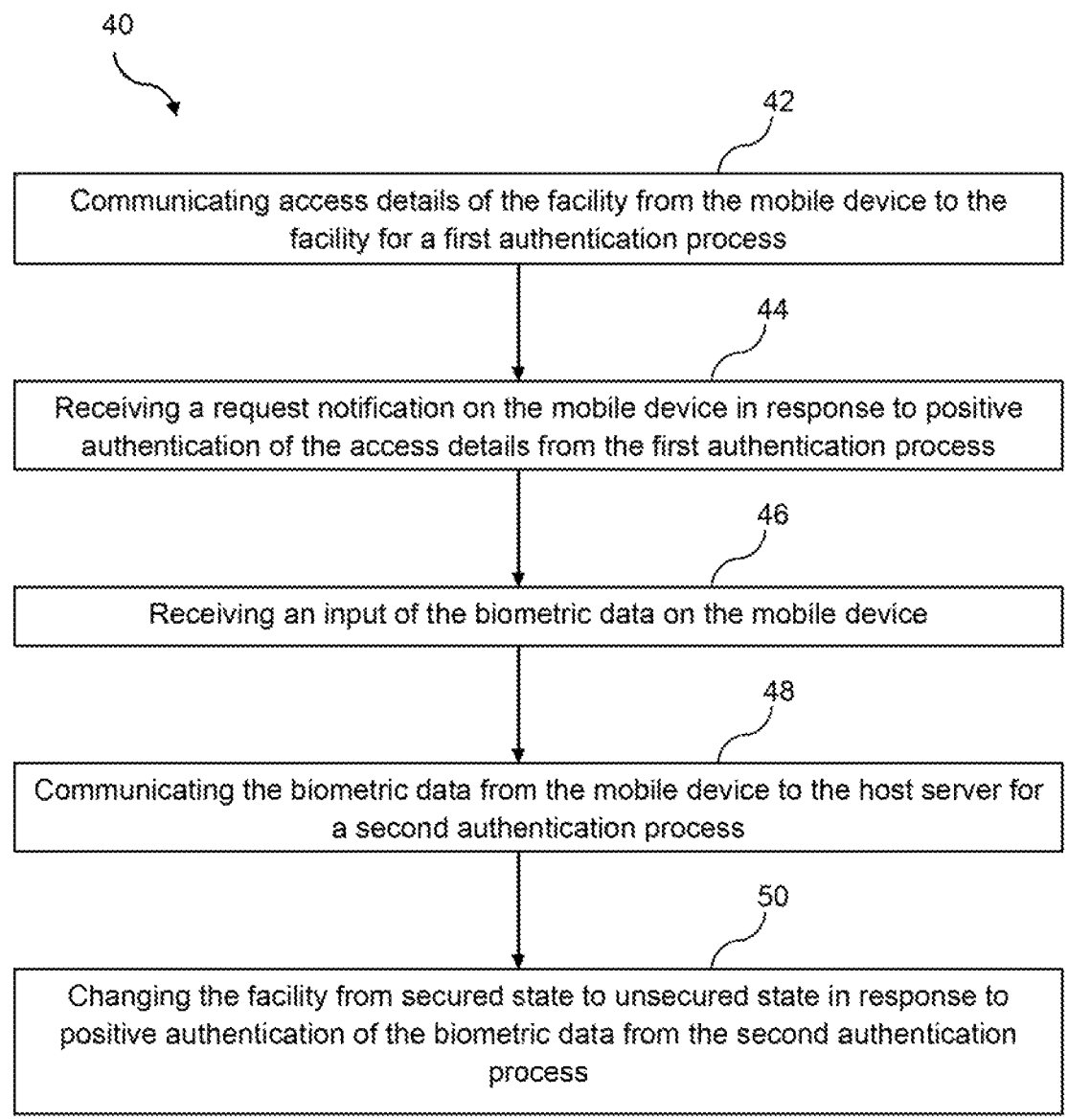
FIG. 2 is a flowchart illustration of the method of FIG. 1 implemented on a mobile device for controlling access to a facility.

A user's electronic device, e.g. a mobile device 300, is configured to be in communication within the system 10 for the user to gain access to the facility 20. The mobile device 300 may include mobile phones, smartphones, personal digital assistants (PDAs), key fobs, transponder devices, NFC-enabled devices, tablets, portable display devices, and/or computers. Referring to FIG. 2, there is a method 40 for controlling access to the facility 20. Particularly, the method 40 is a computerized method 40 performed by a software application executable on the mobile device 300 belonging to the user for controlling access to the facility 20.

The method 40 comprises a step 42 of communicating access details of the facility 20 from the mobile device 300 to the facility 20 for a first authentication process. The mobile device 300 communicates with the facility 20 when the mobile device 300 is located in the vicinity of the facility 20. More specifically, the mobile device 300 may communicate with the electronic device 30 of the facility 20 when the mobile device 300 is located in the vicinity of the electronic device 30, e.g. directly in front thereof. This provides an initial confirmation that the user is holding the mobile device 300 at/near/outside the facility 20.

The method 40 further comprises a step 44 of receiving a request notification on the mobile device 300 in response to positive authentication of the access details from the first authentication process. The request notification is sent from the host server 100 and comprises a request for biometric data of the user. The biometric data may include, but is not limited to, a photo of the user's face or a fingerprint. The method 40 further comprises a step 46 of receiving an input of the biometric data on the mobile device 300. The method 40 further comprises a step 48 of communicating the biometric data from the mobile device 300 to the host server 100, preferably in encrypted form, for a second authentication process. In the step 48, the communication of the biometric data occurs directly between the mobile device 300 and the host server 100, without involvement of the client server 200, facility 20, or the electronic device 30. In a subsequent step 50, the facility 20 changes or transitions from the secured state to the unsecured state in response to positive authentication of the biometric data from the second authentication process, thereby providing, to the user, access to the facility 20. Specifically, if the biometric data is positively authenticated in the second authentication process, the positive authentication result or message is communicated from the host server 100 to the facility 20 or to the client server 200 managing it. More specifically, in the step 50, the positive authentication result or message may be communicated from the host server 100 to the electronic device 30 (e.g. via the client server 200), such that the electronic device 30 may be deactivated. Deactivation of the electronic device 30 consequently changes the facility 20 from the secured/locked/inaccessible state to the unsecured/unlocked/accessible state, thereby releasing the facility 20 to the user for his/her usage.

Figure 3:
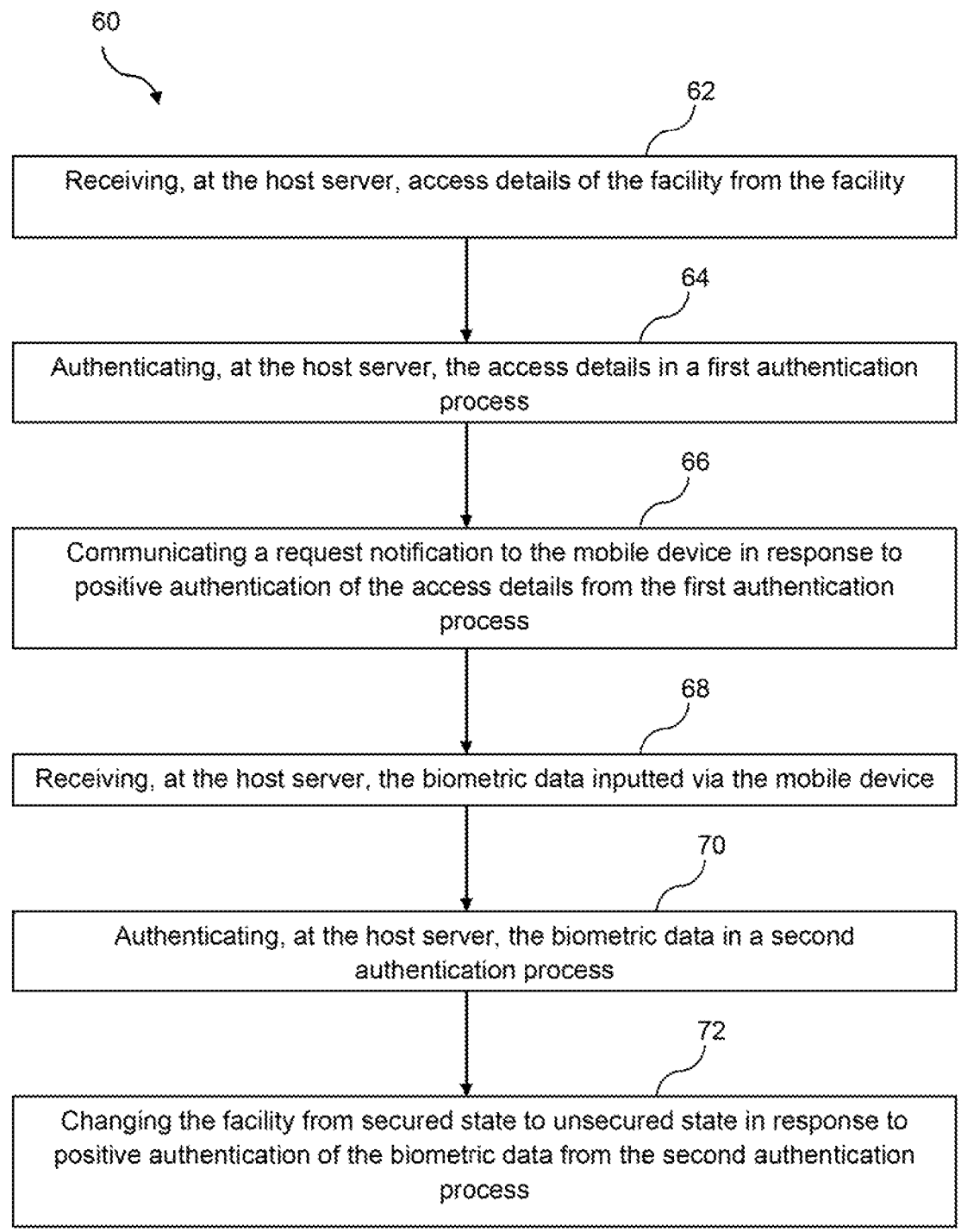
FIG. 3 is a flowchart illustration of a method of FIG. 1 implemented on a host server for controlling access to a facility.

From the perspective of the host server 100 of the system 10, with reference to FIG. 3, there is a method 60 for controlling access to the facility 20. Particularly, the method 60 is a computerized method 60 performed by a processor of the host server 100. The method 60 comprises a step 62 of receiving, at the host server 100, access details of the facility 20 from the facility 20. The access details are communicated from the user's mobile device 300 to the facility 20 (or electronic device 30) when the mobile device 300 is located in the vicinity of the facility 20 (or electronic device 30). The method 60 further comprises a step 64 of authenticating, at the host server 100, the access details in a first authentication process; and a step 66 of communicating a request notification to the mobile device 300 in response to positive authentication of the access details from the first authentication process. The request notification comprises a request for biometric data of the user. The method 60 further comprises a step 68 of receiving, at the host server 100, the biometric data inputted via the mobile device 300. In the step 68, the communication of the biometric data occurs directly between the mobile device 300 and the host server 100, without involvement of the facility 20, client server 200, or the electronic device 30. The host server 100 then, in a step 70, authenticates the biometric data in a second authentication process. In a subsequent step 72, the facility 20 changes from the secured state to the unsecured state in response to positive authentication of the biometric data from the second authentication process, thereby providing, to the user, access to the facility 20. In the step 72, the electronic device 30 may be deactivated to change the facility 20 from the secured state to the unsecured state, thereby releasing the facility 20 to the user for his/her usage.

Thus, through the implementation of the method 40 on a software application executable on the mobile device 300, and correspondingly the method 60 on the host server 100, the user can make use of the mobile device 300, together with the host server 100 and client server 200 of the system 10 for access control, to directly gain access to the facility 20, e.g. hotel room or rental vehicle, bypassing the conventional time-consuming check-in/accessing procedures at the reception area. Moreover, the system 10 and methods 40 and 60 make use of two-factor authentication (2FA) to control access to the facility 20, thereby providing stronger authentication and keeping the facility 20 more secure, allowing only authorized or authenticated users to access and use the facility 20. The first factor authenticates, in the first authentication process, that the user's mobile device 300 is communicating the correct access details or information associated with the ownership, reservation, or booking of the facility 20. The second factor authenticates, in the second authentication process, the identity of the user to ensure that the correct person is attempting to gain access to the facility 20. The second authentication process is performed with the use of biometric data of the user. Therefore, the system 10 and methods 40 and 60 provide improved access control and also a more secure and quicker way of providing, to the user, access to a facility 20.

Figure 4:
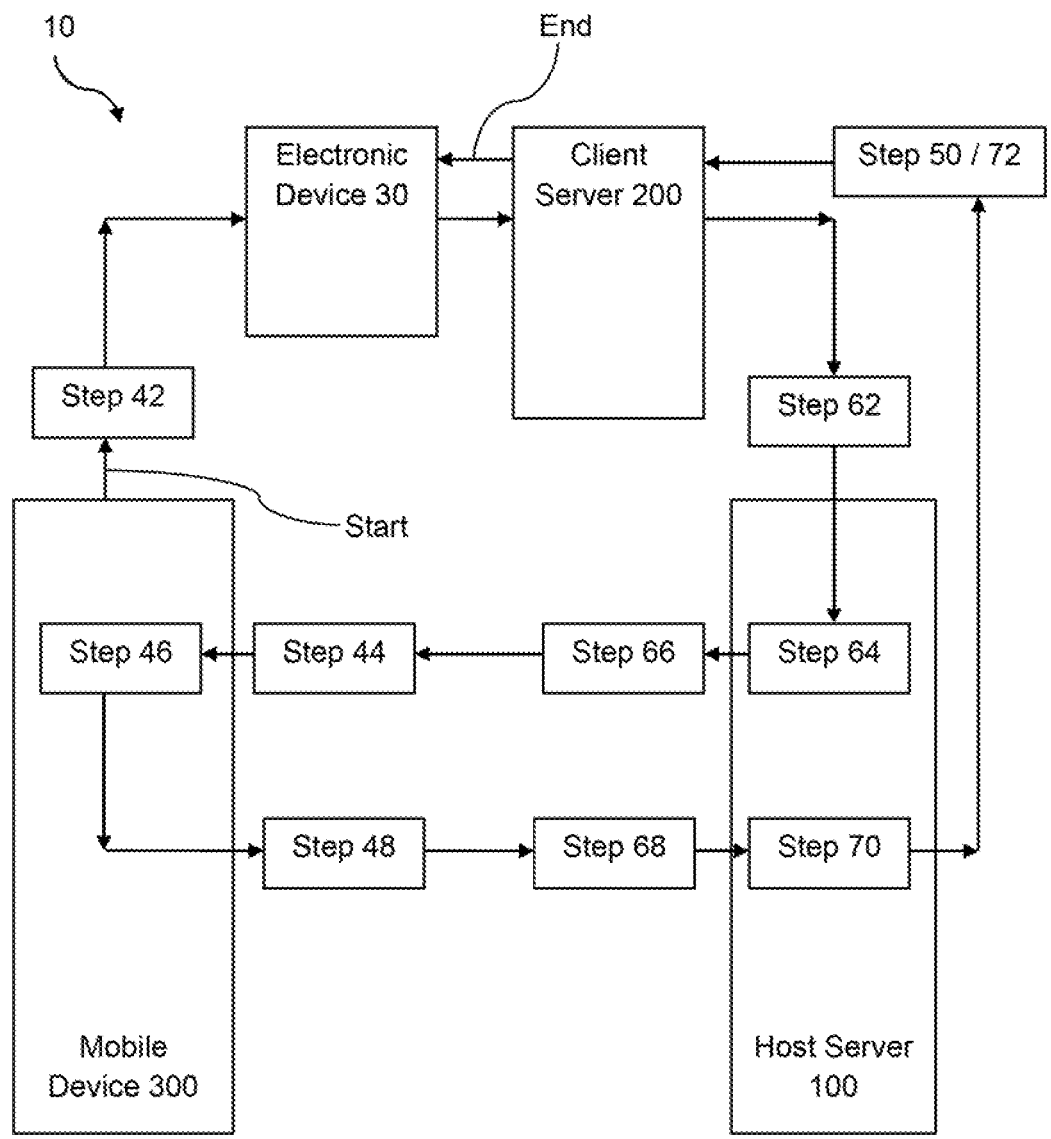
FIG. 4 is an illustration of a system of FIG. 1, illustrating the process flow of the method for controlling access to a facility.

FIG. 4 shows a schematic diagram of the system 10, illustrating the process flow of the methods 40 and 60 during an attempt by the user to release the facility 20 (i.e. change or transition from the secured state to the unsecured state) for gaining access thereto. Particularly, FIG. 4 illustrates the process flow of the steps 42, 44, 46, 48, and 50 of the method 40 implemented on the mobile device 300, together with the process flow of the steps 62, 64, 66, 68, 70, and 72 of the method 60 implemented on the host server 100.

In some embodiments, the facility 20 may be owned by the user, i.e. permanently belonging to the user or at least for a significant period of time in the future. In some other embodiments, the facility 20 may be temporarily owned or belonging to the user, e.g. a temporary reservation or booking.

In one embodiment, the facility 20 may be a venue/location which the user has reserved or booked for use over a predetermined time duration or period. For example, the facility 20 may be a hotel room which the user (e.g. tourist) has booked for an upcoming holiday trip. The hotel room is initially in the secured state for preventing access thereto, and is maintained as such with an electronic device 30. The electronic device 30 may be an electronic or digital lock which may be positioned on the door of the hotel room. As described above, the electronic device 30 is designed to read data from an external input in order to actuate its internal mechanisms so that the hotel room can be unlocked, i.e. changed or transitioned from the secured state to the unsecured/unlocked/accessible state. An example of an internal mechanism in the electronic device 30 would be one which withdraws a latch from a strike plate, or which releases a spindle such that a knob or handle can be turned to withdraw the latch from the strike plate). Other internal mechanisms for deactivating the electronic device 30 and unlock the door to unsecure/release the initially secured hotel room may be contemplated by the skilled person.

In order to gain access to, i.e. enter into and occupy the hotel room, the user may use his/her mobile device 300 to perform the step 42, i.e. communicate the access details from the mobile device 300 to the electronic device 30 locking the hotel room. The access details (e.g. information on reservation or booking of the hotel room) are subsequently sent to the host server 100, which then performs the steps 62 and 64 to authenticate the access details in the first authentication process. The host server 100 then performs the step 66 of communicating a request notification to the mobile device 300 and received by the user in the step 44. The user, upon seeing the request notification, performs the step 46 of inputting his/her biometric data on the mobile device 300. The biometric data is communicated directly to the host server 100 in the steps 48 and 68. The host server 100 then performs the step 70 to authenticate the biometric data in the second authentication process.

If the biometric data is positively authenticated in the second authentication process, the positive authentication result or message is communicated from the host server 100 to the electronic device 30. As described in the step 72, the electronic device 30 deactivates to change the hotel room from the secured state to the unsecured state in response to the positive authentication of the biometric data. Accordingly, the deactivation of the electronic device 30 consequently changes the hotel room from the secured/locked/inaccessible state to the unsecured/unlocked/accessible state, thereby releasing the hotel room to the user for his/her usage, e.g. for occupation thereof. It should also be appreciated that the hotel room would have network or internet connectivity in order to communicate with the host server 100 and/or client server 200 for unlocking of the hotel room door. The network or internet connectivity may, for example, be provided by the infrastructure of the hotel building.

Further, the hotel room may automatically return to or revert back to the secured state after a predetermined duration has lapsed since the change from the secured state to the unsecured state. For example, after the user has unlocked and entered the hotel room, the electronic device 30 may re-activate itself to re-lock the hotel room, i.e. change back to the secured state, after a predetermined duration of time has lapsed, e.g. after 30 seconds. This is to ensure that the hotel room is almost always maintained in the secured state for preventing access by unauthorized or unauthenticated people. Notably, the hotel room may comprise mechanisms that enable the user to unlock the hotel room from within.

Therefore, by utilizing the methods 40 and 60, the user can make use of the mobile device 300 to directly gain access to hotel room, bypassing the conventional time-consuming check-in/accessing procedures at the hotel reception. Further, as no key cards are issued by the hotel reception, there would be no risk of losing them.

In another embodiment complementary to the aforementioned example on the hotel room, the facility 20 may be equipment which the user intends to access and use during his/her holiday. For example, the facility 20 or equipment may be a rental vehicle or car which the user has booked for a road trip during the holiday. The rental vehicle is parked at a parking garage or car park belonging to the vehicle rental company operating a fleet of such rental vehicles. The booked rental vehicle is initially in the secured state and is maintained as such with an electronic device 30. The electronic device 30 may be an electronic or digital lock which may be positioned on the door of the rental vehicle, such as for vehicles that operate on keyless access or entry systems. The electronic device 30 for the rental vehicle may be similar or analogous in functionality to the electronic device 30 for the hotel room.

In order to gain access to, i.e. enter into and drive the rental vehicle, the user may use his/her mobile device 300 to perform the method 40 in conjunction with the method 60 performed at the host server 100. It would be appreciated that the various aspects/features/elements of the embodiment in relation to the hotel room apply similarly or analogously to the embodiment in relation to the rental vehicle. For purpose of brevity, such similar or analogous aspects/features/elements are not further elaborated upon. It should also be appreciated that the rental vehicle would have network or internet connectivity in order to communicate with the host server 100 and/or client server 200 for unlocking thereof. The network or internet connectivity may, for example, be provided by the office building/area near to the rental vehicle is parked (e.g. if the rental vehicle is within a Wi-Fi range of the office building/area).

Therefore, by utilizing the methods 40 and 60, the user can make use of the mobile device 300 to directly gain access to rental vehicle, bypassing the conventional time-consuming check-in/accessing procedures at the reception area, e.g. at an office building of the vehicle rental company. The user can walk directly to the rental vehicle parked at the parking garage and gain access to it using his/her mobile device 300. Similar to the hotel room, after the user has entered the rental vehicle, the rental vehicle may automatically return to the secured state after a predetermined duration has lapsed. Notably, the rental vehicle may comprise mechanisms that enable the user to unlock the rental vehicle from within.

In yet another embodiment, the facility 20 may be equipment, e.g. a storage facility, which the user intends to access and use, e.g. for temporary storage of personal items or long-term storage of valuable articles. For example, the facility 20 or equipment may be a shared storage locker for temporary use by a sports team, a personal mailbox, a courier service storage locker for the user to collect items delivered by the courier service, or a safe deposit box in a bank for the user to keep his/her valuables for an extended period of time. The storage facility may even be a warehouse where a user may store goods. The storage facility may be locked with an electronic device 30, e.g. electronic or digital lock, similar or analogous in functionality to that for the hotel room and rental vehicle.

In order to gain access to the storage facility, the user may use his/her mobile device 300 to perform the method 40 in conjunction with the method 60 performed at the host server 100. It would be appreciated that the various aspects/features/elements of the embodiment in relation to the hotel room and rental vehicle apply similarly or analogously to the embodiment in relation to the storage facility. For purpose of brevity, such similar or analogous aspects/features/elements are not further elaborated upon. It should also be appreciated that the storage facility would have network or internet connectivity in order to communicate with the host server 100 and/or client server 200 for unlocking thereof. The network or internet connectivity may, for example, be provided by the infrastructure of the building housing the storage facility. Therefore, by utilizing the methods 40 and 60, the user can make use of the mobile device 300 to directly gain access to storage facility. If the user is expecting a courier delivery, he/she can collect the delivery at his/her own time from the storage locker, without having to wait at home for a delivery person to arrive. If the user is part of a sports team which is allocated a storage locker, any member of the team can gain access to the storage locker using his/her own mobile device (as further described below in the group registration process 500). Like the hotel room, there would be no physical lock keys for the storage locker and thus no risk of losing them.

In yet another embodiment, the facility 20 may be equipment, e.g. computer/electronic device/machine, which the user intends to access and use. Such equipment may be of high or advanced technology, e.g. electronic machines dedicated to perform highly specialized functions. The equipment may also be computers or computing devices/machines that have propriety software installed therein, and the user intends to use that propriety software, e.g. for data analytics or 3D design/modeling. The electronic/computing machines may be locked or maintained in the secured/inaccessible state through the use of hardware/software modules/applications, e.g. electronic/software/digital locks.

In order to gain access to the electronic/computing machine, the user may use his/her mobile device 300 to perform the method 40 in conjunction with the method 60 performed at the host server 100. As described above, for purpose of brevity, similar or analogous aspects/features/elements related to the methods 40 and 60 are not further elaborated upon. It should also be appreciated that the electronic/computing machine has its own network or internet connectivity in order to communicate with the host server 100 and/or client server 200 for unlocking thereof. Therefore, by utilizing the methods 40 and 60, the user can make use of the mobile device 300 deactivate the electronic/software/digital locks on the electronic machine, thereby gaining access to the electronic/computing machine.

In yet another embodiment, the facility 20 may be a website, online portal, or application which the user intends to access. The website may be locked or maintained in the secured/inaccessible state through the use of software or virtual security measures. In order to gain access to the website, the user may use his/her mobile device 300 to perform the method 40 in conjunction with the method 60 performed at the host server 100. As described above, for purpose of brevity, similar or analogous aspects/features/elements related to the methods 40 and 60 are not further elaborated upon. Therefore, by utilizing the methods 40 and 60, the user can make use of the mobile device 300 deactivate the virtual security measures and gain access to the website, online portal, or application.

In various embodiments of the present disclosure, with reference to FIG. 5 to FIG. 8, the software application for performing the method 40 is executable or executed by the user on the mobile device 300. For a first-time user, the user may be required to perform an individual registration process 400 on the mobile device 300. If the facility 20 is owned by or belongs to multiple users/group of users, or if the user is reserving or booking the facility 20 as part of a group, e.g. tourist groups or teams of people, the user may perform a group registration process 500 which would allow all members or participants of the same group as the user to gain access to the facility 20. The reserving or booking of the facility 20 may be performed, via a reservation process 600, on the mobile device 300 or alternatively on a separate computing device. It would be readily apparent to the skilled person that the individual registration process 400, group registration process 500, and/or reservation process 600 are performed prior to the step 42 of the method 40. When it is time to access and use the facility 20, the user operates the software application on the mobile device 300 to perform an accessing process 700 based on the method 40 and method 60 to directly gain access to the facility 20.

Individual Registration Process 400

Figure 5:
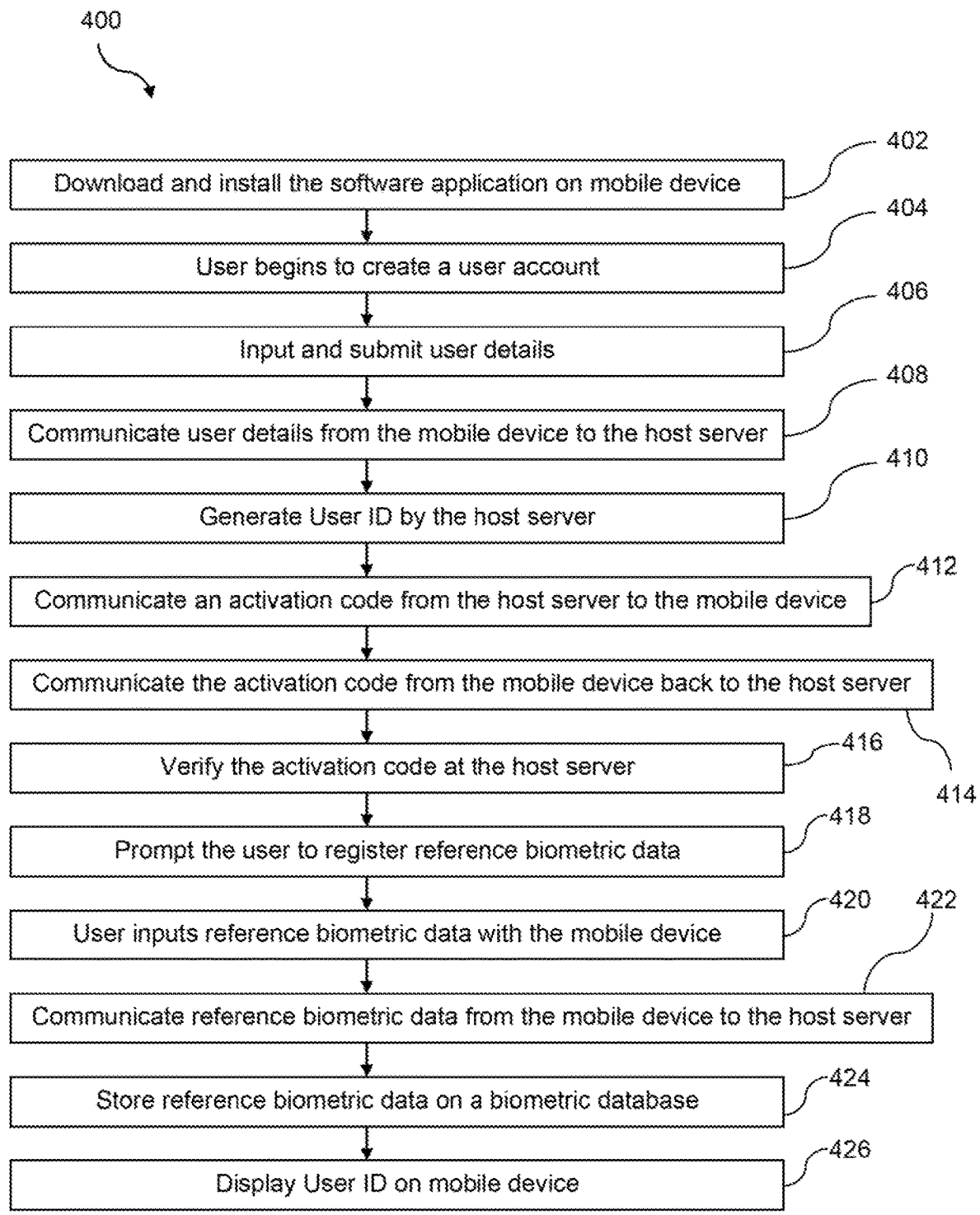
FIG. 5 is an illustration of an individual registration process in a method for controlling access to a facility, in accordance with an embodiment of the present disclosure.

Referring to FIG. 5, if the user is a first-time user of the software application, the user may be required to download and install the software application on his/her mobile device 300, as indicated in a step 402 of the individual registration process 400. In a step 404, the user executes the software application and begins to create a user account. The creation of the user account may require the user to input and submit his/her user details, in a step 406. The user details may include, but are not limited to, the user's full name, email address, phone number (preferably the phone number associated with the mobile device 300), address, nationality and identification number, such as national ID, driver's license ID, or passport number (to prevent duplicate accounts). In a step 408, the user details are communicated from the mobile device 300 to the host server 100 for further processing.

In a step 410, a unique identifier or user identification (User ID) is generated by the host server 100. To verify that the creation of the user account is intended by the user and to activate the user account, the host server 100 communicates, in a step 412, an activation code to the mobile device 300 based on the phone number as indicated in the user details. The activation code may be communicated to the email address instead, depending on the preference of the user. The activation code may be, for example, a 6-digit or 6-character one-time password (OTP) and the user is required to input or enter the OTP into the software application using the mobile device 300, in a step 414, to communicate the OTP from the mobile device 300 back to the host server 100 for activating the user account.

A device token of the mobile device 300 may be communicated to the host server 100 for verification of the OTP by the host server 100 in a step 416. The device token may contain identifier data (e.g. a media access control (MAC) address) of the mobile device 300 and may further comprise data analogous to or representative of the user's phone number of the mobile device 300. The device token thus associates the mobile device 300, User ID, and user phone number together. Preferably, the unique User ID is associated with only one user phone number which is operative on only one mobile device 300 at any one time. Thus, the user account created by the user and identified by the User ID can only be operative on one mobile device 300 at any one time. Upon verification of the OTP by the host server 100 and successful activation of the user account, details of the user account and the User ID identifying the account are recorded on an accounts database. The accounts database may reside on the host server 100, or alternatively on a remote computer communicatively linked to the host server 100.

In a step 418, the software application prompts the user to register his/her reference biometric data with his/her user account identified by the User ID. The prompt may be in the form of a visual notification displayed on the mobile device 300. The user, in a step 420, inputs reference biometric data with the mobile device 300. The reference biometric data is thus associated with the user account created by the user and identified by the User ID. The reference biometric data may include, but is not limited to, a photo of the user's face and/or a fingerprint.

If the reference biometric data is a photo of the user's face, the mobile device 300 may comprise an image capture device or camera for capturing the photo in the form of image data. The image data is thus a still image of the user's face. Alternatively, the image data may comprise a set of images, such as a series of images or a video sequence. If the reference biometric data is a fingerprint, the mobile device 300 may comprise a fingerprint reader for scanning and recording prints from at least one of the user's digits or fingers. Prints from multiple fingers may be scanned and recorded so that the user may still rely on fingerprint recognition if one of his/her scanned fingers is injured such that a legible print or scan cannot be obtained.

The reference biometric data may alternatively or additionally include retinal information of the user. The retinal information may be captured with an Intelligent Retinal Imaging System (IRIS) together with a high-definition camera of the mobile device 300 to scan or screen retinal information from the user's eye(s).

In a step 422, the reference biometric data is communicated from the mobile device 300 to the host server 100. In a step 424, the reference biometric data of the user is stored and updated on a biometric database. The biometric database may reside on the host server 100, or alternatively on a remote computer communicatively linked to the host server 100. The biometric database also stores and updates reference biometric data of other users with other user accounts. Notably, the reference biometric data is stored at the biometric database of the host server 100 in preparation for the second authentication process described above.

Upon successful registration of the reference biometric data, the unique User ID of the user account created by the user is displayed on the mobile device 300 in a step 426. The user may use the User ID for reserving facilities 20 in future, as described in the reservation process 600 below. The user may also use the User ID for registering facilities 20 that are owned or belong to him/her. The individual registration process 400 for the user is completed upon successful receipt of the unique User ID.

Group Registration Process 500

The user account created by the user may be associated with at least one other user account or with a group of user accounts through the group registration process 500. The group registration process 500 allows multiple users to form a single group, i.e. the group of user accounts, each user account belonging to a user and created according to the individual registration process 400. The grouping of users and user accounts facilitates multiple users to gain access to the same facility 20, such as if the users are a family staying together (for access to their home), or are part of a tourist group (for access to a hotel room or rental vehicle), or if the facility 20 is some equipment reserved for common usage by a group of people (e.g. a shared storage locker for a sports team).

Figure 6:
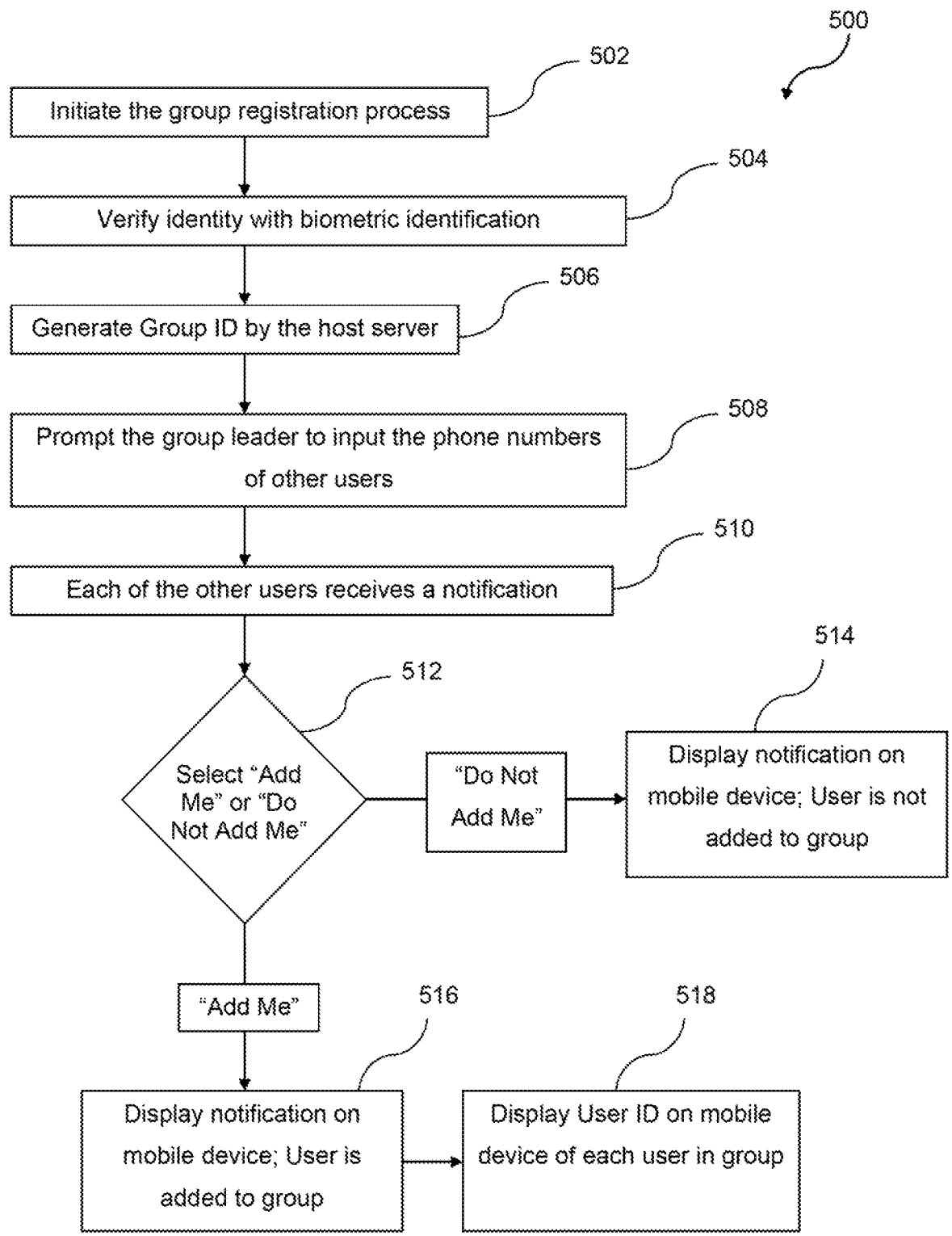
FIG. 6 is an illustration of a group registration process in a method for controlling access to a facility, in accordance with an embodiment of the present disclosure.

Referring to FIG. 6, a user may initiate, in a step 502, the group registration process 500 via a function on the software application executed on the mobile device 300. For clarity, the user initiating the group registration process 500 will be referred to as the group leader. The group leader may be required to verify his/her identity with biometric identification in a step 504. In the step 504, the group leader may be required to input his/her biometric data on the mobile device 300, and the biometric data is then communicated to the host server 100 for authenticating the received biometric data against the biometric database. The type of biometric data inputted on the mobile device 300 is dependent on the reference biometric data of the group leader as stored on the biometric database.

Upon verification of the group leader's identity in the step 504, a unique identifier or group identification (Group ID) is generated by the host server 100 in a step 506. In a step 508, the software application prompts the group leader to input identification details of other users who the group leader intends to add to the group identified by the unique Group ID. The identification details may be the users' phone numbers or email addresses. The prompt may be in the form of a visual notification displayed on the mobile device 300 of the group leader.

If any of the other users do not already have a User ID, e.g. they have not installed the software application and/or have not created a user account through the individual registration process 400, the "unregistered" users may receive a notification, such as a short message service (SMS) text on their mobile phones or an email. The notification informs the "unregistered" users to create a user account in order to join or be added to the group, and guides them through the individual registration process 400.

If the other users already have their respective unique User IDs, i.e. they have already created their respective user accounts through the individual registration process 400, they will, in a step 510, receive a notification on their mobile devices if they are added by the group leader. The notification is displayed through the software application executed on their mobile devices. Each of them can select whether or not to join the group. For example, in a step 512, each of them can select an "Add Me" function if he/she agrees to join the group; or a "Do Not Add Me" function if he/she does not agree to join the group. If a user selects not to join the group, a notification may be displayed on the user's mobile device in a step 514, and the user will not be added to the group created by the group leader and identified by the Group ID. Conversely, if a user selects to join the group, a notification may be shown on the user's mobile device in a step 516, and the user will be added to the group.

Upon successfully adding users into the group, the unique Group ID of the group created by the group leader is displayed on each mobile device belonging to the users in the group in a step 518. Each user belonging to the group has their reference biometric data stored on the biometric database, and will be allowed to gain access to the facility 20, e.g. a hotel room reserved or booked by the group leader. In addition, for future reservations or bookings of a facility 20 by any one user of the group, other users of the same group may also be allowed to gain access to the facility 20. Users of the group, who may be part of the same household, can also gain access to the facility 20, e.g. their house which may be owned by the group leader. Details of the user accounts in the group and the Group ID identifying the group are recorded on the accounts database.

Once a user has joined the group, he/she has the option to leave the group at any time. The group leader may also disband the group at any time. These may occur, for example, after a tour trip or team activity has ended. The software application may include a "Chat" function that allows users belonging to the same group to chat among themselves and stay updated about the activities associated with the facilities 20, e.g. reservations and bookings thereof.

Reservation Process 600

The user may perform the reservation process 600 to make a reservation or booking of a facility 20. The reservation process 600 may be performed, on the mobile device 300 or alternatively on a separate computing device, such as a tablet, laptop or personal computer (PC). The reservation process 600 may be performed by the user by visiting an online interface, e.g. an online portal or website of the facility 20, or at actual physical locations such as management offices or agencies of the facility 20. The reservation process 600 may alternatively be performed when the user visits the premises or site of the facility 20, such as if the facility 20 is a hotel or meeting venue, or if the facility 20 is some equipment (e.g. rental vehicle) located at the premises or site. The mobile device 300 is in communication, directly or indirectly, with the client server 200 of the facility 20 during the reservation process 600.

Figure 7:
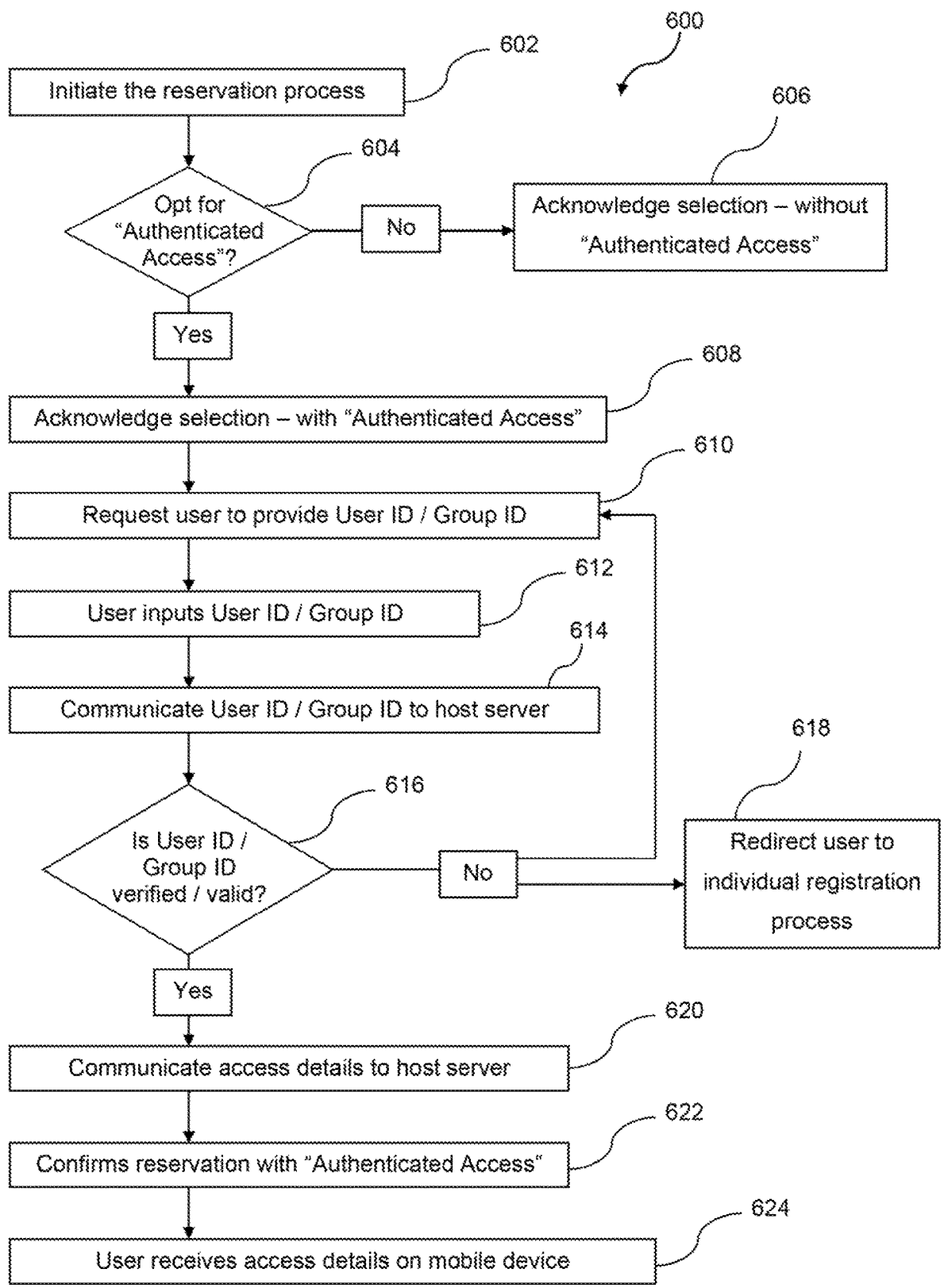
FIG. 7 is an illustration of a reservation process in a method for controlling access to a facility, in accordance with an embodiment of the present disclosure.

Referring to FIG. 7, in a step 602, the user initiates the reservation process 600 by selecting the preferred facility 20 and the required dates and/or times/durations, and proceeding to confirm the reservation of facility 20. In a step 604, the user may select whether to opt for "Authenticated Access", which would allow the user to directly gain access to the facility 20 (relying on the system 10 and method 40). If the user does not opt for "Authenticated Access", the client server 200 receives and acknowledges the selection and further confirms, in a step 606, the reservation of the facility 20 without "Authenticated Access", i.e. with the normal check-in/accessing procedures at the reception area of the facility 20 (e.g. hotel reception).

If the user opts for "Authenticated Access", the client server 200 receives and acknowledges the selection in a step 608. The client server 200 then communicates a request, in a step 610, to the mobile device 300, requesting for the user to provide his/her User ID (as determined from the individual registration process 400) or a Group ID (as determined from the group registration process 500). In a step 612, the user proceeds to input a User ID or Group ID via the online interface for communication to the client server 200. The User ID or Group ID is received by the client server 200 and the client server 200 subsequently communicates, in a step 614, the received User ID or Group ID to the host server 100, which is communicatively linked to the client server 200, for verification thereof. In a step 616, the host server 100 verifies the User ID or Group ID against the accounts database.

If the User ID or Group ID cannot be verified or is invalid, the online interface may return to the step 610 to request the user to provide a valid User ID or Group ID. This may happen if the user makes an error when inputting the User ID or Group ID. The online interface may additionally guide or redirect the user, in a step 618, to perform the individual registration process 400 or group registration process 500. If the User ID or Group ID is verified to be valid in the step 616, the access details or details of the reservation of the facility 20 may be communicated, in a step 620, from the client server 200 to the host server 100. The access details may thus be shared between the client server 200 and the host server 100.

The client server 200 may comprise an access records database for storing the access details, and the host server 100 communicatively linked to the client server 200 is allowed access to the access records database for retrieving the access details as necessary, such as to perform the accessing process 700 as described below. Alternatively, each of the client server 200 and the host server 100 has an access records database residing thereon for storing the access details. The access records databases in both the client server 200 and host server 100 may be synchronized or updated (e.g. in real-time or periodic intervals) to ensure accuracy of the access details. Yet alternatively, the access records database may reside on a remote computer communicatively linked to the host server 100 and client server 200.

At the same time, in a step 622, the client server 200 confirms the reservation of the facility 20 with "Authenticated Access". In a step 624, the user receives the access details on the mobile device 300. The access details may be displayed in a readable format for the user, and stored on the mobile device 300 in a computer-readable format, e.g. in the form of Near-Field Communication (NFC) data (or other forms of wireless communication data, e.g. Bluetooth or Wi-Fi) and/or a matrix barcode such as a quick response (QR) code. Accordingly, the access details are embedded in the NFC data and/or matrix barcode for use later in the accessing process 700.

The access details contain unique information that is specific to the facility 20 and may be further specific to the reservation or booking of the facility 20. This information may include:

A unique identifier of the facility 20;
The dates and/or times/duration for using the facility 20;
User ID or Group ID when reserving the facility 20; and
Dynamic identifier based on the time stamp at the time of confirmation of the reservation at the end of the reservation process 600.

If the user inputted a Group ID in the step 612, the access details may only be communicated to the user who is the group leader. Other users or members of the same group can retrieve the access details with the software application running on their respective mobile devices. When the access details are retrieved by a mobile device of a user in the group, the associated User ID of this user would become embedded in the NFC data and/or matrix barcode. The access details can thus be shared within the group of user accounts for the respective users to access the facility 20.

The reservation process 600 is completed upon successful receipt of the access details on the mobile device 300. However, the user may still make changes to the reservation of the facility 20, such as to update/change/extend the reserved dates and/or times/durations. Such changes may be received by the client server 200 and in turn communicated to the host server 100. The access records database is thus updatable according to the information on the changes in the reservation of the facility 20. The updated information on the access records database is retrievable by the host server 100 via the client server 200. Alternatively, if the client server 200 and host server 100 have access records databases which are synchronized together, the access records databases may be updatable accordingly. Further, if the access details are changed, an updated NFC data and/or matrix barcode with the updated access details embedded therein may also be communicated from the client server 200 to the mobile device 300.

It may be appreciated that the access details may not limited to reservations or bookings of facilities 20. These "temporary" facilities 20 may include, but are not limited to, hotel rooms and rental vehicles. It may contemplated by the skilled person that the access details may comprise ownership details or information related to facilities 20 that belong to or are owned by the user, i.e. permanently belonging to the user or at least for a significant period of time in the future. These "permanent" facilities 20 may include, but are not limited to, residences, mailboxes, and private vehicles. It would be readily apparent to the skilled person that aspects of the reservation process 600 may be implemented on facilities 20 that are owned by the user, such that the access details contain unique information that is specific to the ownership of the facilities 20. The user-owned facilities 20 may be registered with "Authenticated Access" such that the user is able to access the facilities 20 using the method 40 with his/her mobile device 300.

Accessing Process 700

When it is time to access the facility 20 with "Authenticated Access", the user may use the mobile device 300 to perform the accessing process 700 to directly gain access to the facility 20. Referring to FIG. 8A, in a step 702, the user executes the software application and retrieves the access details on the mobile device 300. In a step 704, the user may use the mobile device 300 to communicate the access details to the facility 20, e.g. to the electronic device 30 thereof. The access details are communicated from the mobile device 300 to the facility 20 (or electronic device 30) when the mobile device 300 is located in the vicinity of the facility 20 (or electronic device 30).

The access details may be communicated in the form of NFC data (or other forms of wireless communication data) or a matrix barcode, as desired by the user depending on the configuration of the mobile device 300 and/or the facility 20/electronic device 30. For example, in some embodiments, the communication between the mobile device 300 and the facility 20/electronic device 30 occurs via a wireless communication protocol, e.g. NFC, Bluetooth low energy (BLE), or Wi-Fi. The mobile device 300 may be NFC-enabled and comprises an NFC component, and the facility 20 may likewise be NFC-enabled and comprise an NFC component, e.g. as part of the electronic device 30. In some other embodiments, the access details may be embedded as a QR code displayed on the mobile device 300. The facility 20/electronic device 30 may comprise an optical scanner to visually scan the QR code from a display screen of the mobile device 300.

The use of visible QR codes comes with a risk of them being unknowingly captured with cameras, or lost if they are printed out. To mitigate risk of fraudulent access by impersonators to the facility 20, the QR code may be refreshed by the client server 200 at a predetermined frequency (e.g. every 15 or 30 seconds). The refreshing of the QR code may be synchronized between the client server 200 and the host server 100. The user may thus be required to retrieve the QR code on the mobile device 300 only when he/she is within the vicinity of the facility 20/electronic device 30.

Upon receiving the access details from the mobile device 300, the facility 20/electronic device 30, in a step 706, performs a preliminary authentication of the access details. Specifically, a processor of the facility 20/electronic device 30 verifies whether the access details contain the unique identifier of the facility 20, which is initially in the secured state and which the user is attempting to gain access to. If the identifier does not match that of the facility 20, the accessing process 700 proceeds to a step 707 wherein the facility 20 remains in the secured state (the electronic device 30 may correspondingly remain activated to maintain the facility 20 in the secured state) and the accessing process 700 ends and access is denied. If the identifier matches, the facility 20/electronic device 30 proceeds to communicate, in a step 708, the access details to the host server 100, e.g. via the client server 200.

The access details also include information on the User ID of the user who is attempting to gain access to the facility 20. This User ID may belong to the user who made the reservation of the facility 20 (e.g. hotel room) in the reservation process 600 or who owns the facility 20 (e.g. private residence), or to another user who is part of a group that can access the facility 20. In the latter situation, the Group ID may also be communicated to the host server 100, e.g. via the client server 200.

Upon receiving the access details, the host server 100 proceeds to authenticate the access details in the first authentication process. The first authentication process includes a step 710 wherein the host server 100 authenticates the access details against the access records database. As an example, in the step 710, the host server 100 authenticates the User ID and/or Group ID, unique identifier of the facility 20, and the dynamic identifier based on the time stamp, against the access records database to ensure that the user is the correct person (or one of the persons in the group) who owns or reserved the facility 20. If the access details cannot be positively authenticated, the host server 100 proceeds to a step 712 wherein a notification is communicated to the mobile device 300, informing the user that the access details cannot be authenticated. In a subsequent step 714, the first authentication process and the accessing process 700 ends and the user is denied access to the facility 20. If the access details are positively authenticated in the step 710, the host server 100 proceeds to a step 716 wherein a notification is communicated to the mobile device 300, informing the user that the access details have been positively authenticated. Additionally, the notification includes a request for biometric data of the user. Accordingly, the request notification is communicated to the mobile device 300 in response to positive authentication of the access details from the first authentication process. In a subsequent step 718, the first authentication process ends upon communication of the request notification to the mobile device 300.

Upon seeing the request notification on the mobile device 300, the user may initiate the second authentication process. Referring to FIG. 8B, the second authentication process includes a step 720 wherein the user inputs his/her biometric data on the mobile device 300. Depending on the input components available on the mobile device 300 and/or the type of reference biometric data of the user stored on the biometric database, the user may choose to input a photo of his/her face or a fingerprint. In a step 722, the mobile device 300 communicates the biometric data received on the mobile device 300 to the host server 100 for the second authentication process. Upon receiving the biometric data, the host server 100 proceeds with to authenticate the biometric data in the second authentication process. The second authentication process includes a step 724 wherein the host server 100 authenticates the biometric data against the biometric database. Alternatively, the host server 100 may communicate and operate with an affiliated external network to authenticate the biometric data.

If the biometric data and reference biometric data stored on the biometric database are photos of the user's face, the host server 100 may rely on facial recognition technology and/or algorithms to analyze the facial features and determine whether the photo in the biometric data significantly matches the photo in the reference biometric data. If the biometric data and reference biometric data stored on the biometric database are fingerprints, the host server 100 may rely on matching algorithms to compare the fingerprints features, such as the patterns and minutiae features. The biometric data and reference biometric data may alternatively include retinal information derived from the user's eye(s). Further, in some embodiments, the second authentication process may require the user to input multiple and different types of biometric data.

A set of conditions or criteria may be employed to assess whether the biometric data and reference biometric data significantly match each other in order to determine positive or negative verification of the user's identity. The set of conditions may be predefined by the user and/or by the host server 100, as described below.

In some embodiments, the set of conditions may be predefined by the user through the software application on the mobile device 300, and subsequently communicated to the host server 100. The set of conditions may be predefined and adjusted by the user as necessary, such as to be less or more stringent when determining positive verification. In some situations, the user may choose to define the set of conditions to be less stringent so as to avoid or reduce the occurrence of False Non Match (FNM). FNM may occur when the user captures a still image of his/her face to obtain the image data, but the step 724 fails to positively verify his/her identity. Less stringent conditions would increase the probability of positive verifications. However, this correspondingly increases the risk of impersonators misusing the mobile device 300, particularly if the mobile device 300 is lost, compromising the security of the facility 20 as the impersonator(s) may attempt to access the facility 20. Conversely, the user may choose to define the set of conditions to be more stringent so as to avoid or reduce the occurrence of False Match (FM). FM may occur when an impersonator captures a still image of his/her face to obtain the image data, and the step 724 erroneously verifies him as the user. More stringent conditions would reduce the probability of positive verifications from impersonators. However, this correspondingly increases the probability of FNM from the true user. The user may try to achieve a balance by adjusting the set of conditions appropriately.

In some other embodiments, the set of conditions may be defined by the host server 100 without allowing intervention by the user. For example, the host server 100 may define the set of conditions and adjusting the stringency depending on the profile and characteristics of the facility 20 (e.g. accommodation room) reserved by the user. If the facility 20 is a deluxe hotel suite, the set of conditions may be more stringent. Conversely, if the facility 20 is a simple lodging room, e.g. hostel, the set of conditions may be less stringent. In another example, if the facility 20 is a piece of equipment, e.g. a rental vehicle, the stringency of the set of conditions may be adjusted such as based on the cost or value of the equipment. More broadly, the stringency of the set of conditions may be correlated to the cost or value of the facility 20, e.g. amount paid or payable by the user for the purchase or reservation of the facility 20. Notably, the facility 20 may communicate information on the different conditions to the host server 100 by synchronizing its client server 200 with the host server 100.

In the step 724 of the second authentication process, if the biometric data cannot be positively authenticated, the host server 100 proceeds to a step 726 wherein another request notification is communicated to the mobile device 300, requesting the user to input his/her biometric data again. The second authentication process thus returns to the step 720 for the user to input his/her biometric data. The step 726 allows the user to input his/her biometric data for a predetermined number of additional times, e.g. 3 more times or retries. If the biometric data still cannot be positively authenticated despite the provision of step 726, the second authentication process proceeds to a step 728 informing the user, such as by a notification on the mobile device 300, that the biometric data cannot be authenticated. In a subsequent step 730, the second authentication process and the accessing process 700 ends and the user is denied access to the facility 20.

If the biometric data is positively authenticated in the step 724, the host server 100 proceeds to a step 732 wherein the positive authentication result or message is communicated to the facility 20/electronic device 30, e.g. via the client server 200. Since the end of the first authentication process, the facility 20/electronic device 30 would be continuously polling or checking for the authentication result from the host server 100, e.g. via the client server 200. In a subsequent step 734, the facility 20 changes from the secured state to the unsecured state in response to positive authentication of the biometric data from the second authentication process, thereby providing, to the user, access to the facility 20. In the step 734, the electronic device 30 may deactivate in response to the positive authentication so as to change the facility 20 from the secured state to the unsecured state, thereby releasing the facility 20 to the user. Accordingly, the second authentication process and the accessing process 700 end in a step 736 and the user is provided or allowed access to the facility 20.

Further, if the biometric data is positively authenticated, the host server 100 may additionally, in a step 738, communicate a confirmation notification to the mobile device 300 in response to the facility 20 successfully changing from the secured state to the unsecured state. The user would thus be made known or informed of the positive authentication of his/her biometric data and the successful release of the facility 20. The software application may present the confirmation notification in the form of a visual notification (e.g. SMS text or other forms of text messages) and/or sound/audio alert on the mobile device 300 to inform the user of the positive authentication and the allowed access to the facility 20. In case there is an impersonator who manages to successfully gain access to the facility 20 (e.g. by deactivating the electronic device 30) owned or reserved by the user, the user would be quickly made aware of the situation.

In some embodiments, the host server 100 may store historical records of the first authentication process and the second authentication process. The historical records include a history or log of data and metadata associated with the first and second authentication processes, such as the dates and times of the authentications, User ID(s), Group ID(s), and frequency of authentications for each facility 20. Information on the historical records may be availed and accessible by an operator or management of the facility 20 and/or the user. For example, the availing of the historical records may be on demand only, i.e. the operator or management of the facility 20 and/or the user must make a request to the host server 100 to release the information on the historical records.

Information on the historical records could help the user track their past usage of facilities 20. The information could be more relevant to the operator or management of the facilities 20 as data analytics may be applied on the information to derive useful data, such as knowing important user habit-related parameters, user interests in their services, food preferences, etc. The data obtained could assist in future marketing and branding strategies of the facilities 20.

Therefore, by using the accessing process 700 based on the method 40 and method 60 of the present disclosure, the user can directly gain access to the facility 20, bypassing the time-consuming procedures at the reception area. The use of 2FA to access the facility 20 provides greater security and assurance to both the user and the operator or management of the facility 20. The accessing process 700 thus provides improved access control and also a more secure and quicker way of providing, to the user, access to the facility 20.

Moreover, as the host server 100 controls a significant portion of the operations of the methods 40 and 60, there is an advantage in that the client server 200 of the facility 20 requires minimal software and/or hardware upgrading. Further, the system 10 can be scaled upwards so that the host server 100 can operate with a plurality of client servers 200. Each client server 200 may be operative for a particular facility 20, or for a group of facilities 20, such as hotel chains or a fleet of rental vehicles. From the user's perspective, he/she can use the same software application on the mobile device 300 to gain access to any of the facilities 20 that is operative with the host server 100. This provides added convenience to the user as he/she does not have to register again for every facility 20 he/she books.

The following is a description of the technical architectures of the mobile device 300, host server 100, and client server 200.

Figure 9A:
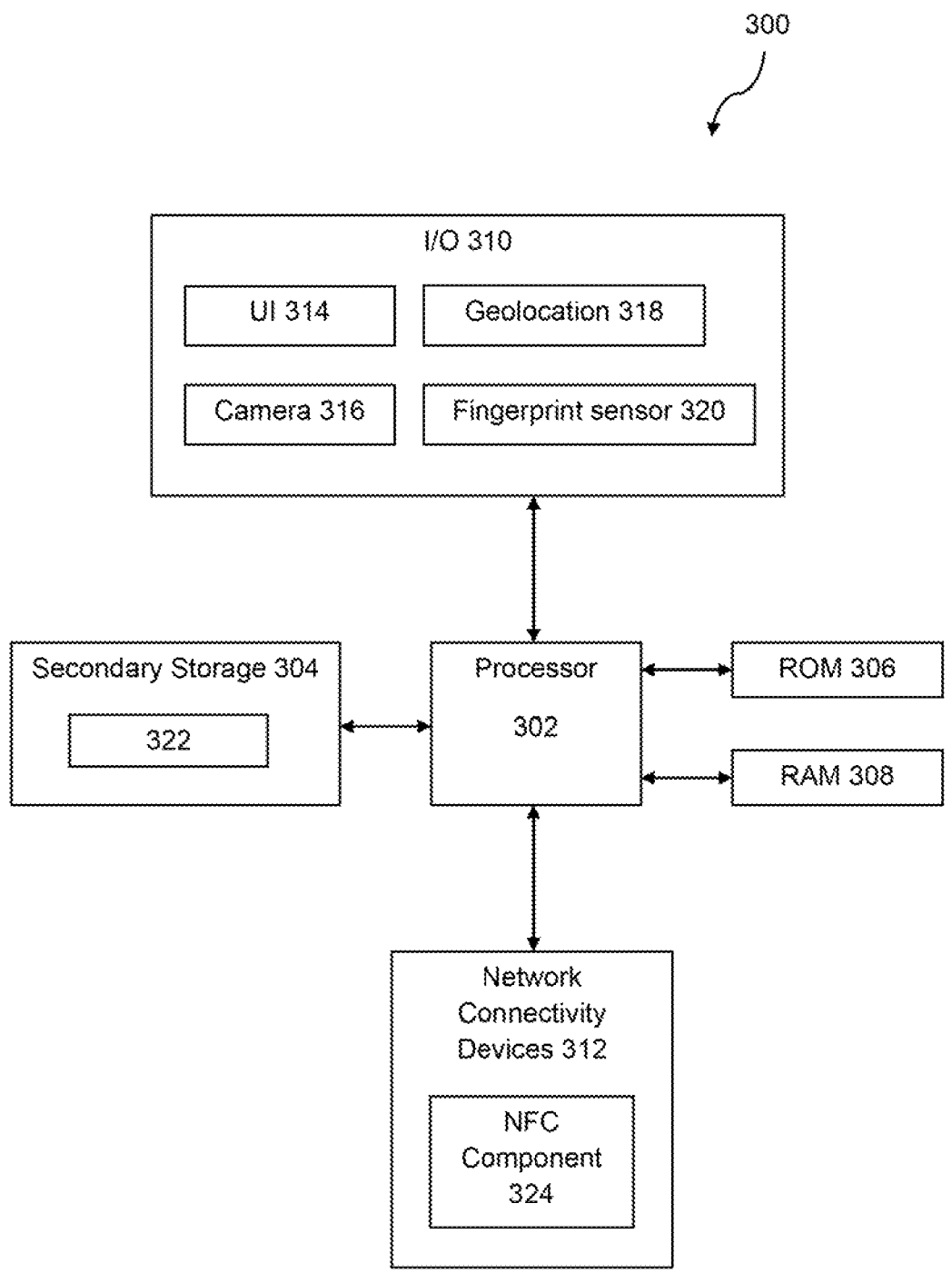
FIG. 9A is an illustration of a block diagram of the technical architecture of a mobile device, in accordance with an embodiment of the present disclosure.

FIG. 9A illustrates a block diagram showing a technical architecture of the mobile device 300. The technical architecture includes a processor 302 (which may be referred to as a central processor unit or CPU) that is in communication with memory devices including secondary storage 304 (such as disk drives or memory cards), read only memory (ROM) 306, and random access memory (RAM) 308. The processor 302 may be implemented as one or more CPU chips. The technical architecture further comprises input/output (I/O) devices 310, and network connectivity devices 312.

The I/O devices 310 comprise a user interface (UI) 314 and an image capture device or camera 316. The mobile device 300 may further include a geolocation module 318. The UI 314 may comprise a touch screen, keyboard, keypad or other known input devices, e.g. fingerprint sensor 320. The camera 316 allows a user to capture image data and save the captured image data in electronic form on the mobile device 300, e.g. on the secondary storage 304. The fingerprint sensor 320 allows a user to read and capture his/her fingerprint for subsequent analysis. The geolocation module 318 is operable to determine the geolocation of the mobile device 300 using signals from, for example global positioning system (GPS) satellites.

The secondary storage 304 is typically comprised of a memory card or other storage device and is used for non-volatile storage of data and as an over-flow data storage device if RAM 308 is not large enough to hold all working data. Secondary storage 304 may be used to store programs which are loaded into RAM 308 when such programs are selected for execution.

The secondary storage 304 has a processing component 322, comprising non-transitory instructions operative by the processor 302 to perform various operations of the method 40 according to various embodiments of the present disclosure. The ROM 306 is used to store instructions and perhaps data which are read during program execution. The secondary storage 304, the ROM 306, and/or the RAM 308 may be referred to in some contexts as computer-readable storage media and/or non-transitory computer-readable media. Non-transitory computer-readable media include all computer-readable media, with the sole exception being a transitory propagating signal per se.

The network connectivity devices 312 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. For example, the network connectivity devices 312 include an NFC component 324 of the mobile device 300. These network connectivity devices 312 may enable the processor 302 to communicate with the Internet or one or more intranets. With such a network connection, it is contemplated that the processor 302 might receive information from the network, or might output information to the network in the course of performing the operations or steps of the method 40. Such information, which is often represented as a sequence of instructions to be executed using processor 302, may be received from and outputted to the network, for example, in the form of a computer data signal embodied in a carrier wave.

The processor 302 executes instructions, codes, computer programs, scripts which it accesses from hard disk, floppy disk, optical disk (these various disk based systems may all be considered secondary storage 304), flash drive, ROM 306, RAM 308, or the network connectivity devices 312. While only one processor 302 is shown, multiple processors may be present. Thus, while instructions may be discussed as executed by a processor 302, the instructions may be executed simultaneously, serially, or otherwise executed by one or multiple processors 302.

Figure 9B:
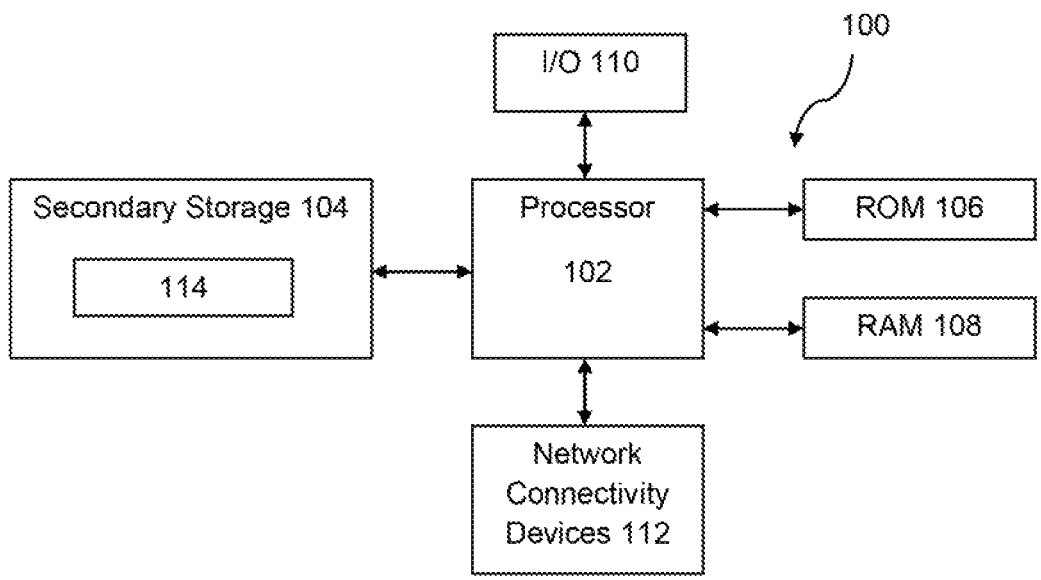
FIG. 9B is an illustration of a block diagram of the technical architecture of a host server, in accordance with an embodiment of the present disclosure.
Figure 9C:
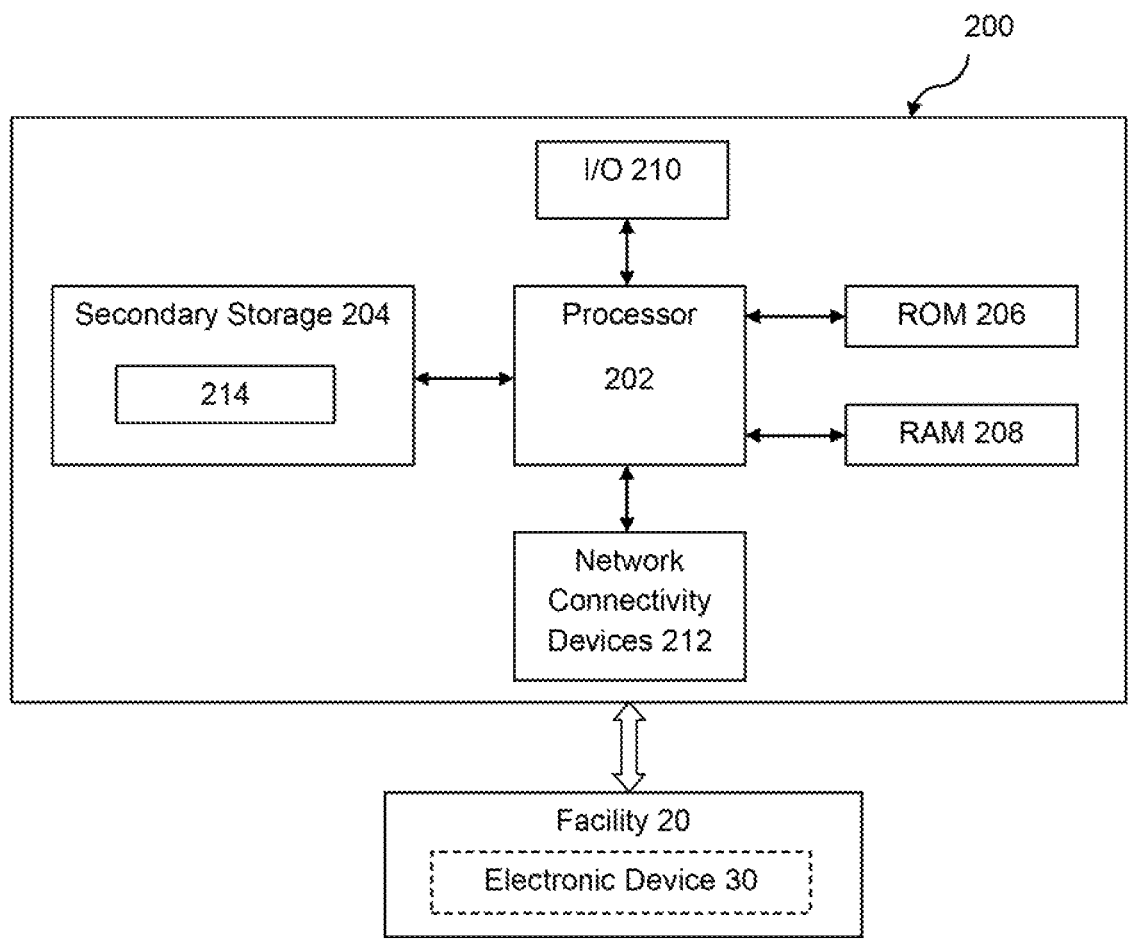
FIG. 9C is an illustration of a block diagram of the technical architecture of a client server, in accordance with an embodiment of the present disclosure.

FIG. 9B and FIG. 9C illustrate block diagrams showing a technical architecture of the host server 100 and client server 200, respectively. It would be readily apparent to the skilled person that the host server 100 and client server 200 have a similar technical architecture. In addition, the client server 200 is communicatively linked with and/or integrated with the facility 20 for controlling and managing operations of the facility 20, which may further include operations of the electronic device 30 or a set of electronic devices 30 which may be part of or housed within the facility 20.

The technical architecture of the host server 100/client server 200 includes a processor 102/202 (which may be referred to as a central processor unit or CPU) that is in communication with memory devices including secondary storage 104/204 (such as disk drives or memory cards), read only memory (ROM) 106/206, and random access memory (RAM) 108/208. The processor 102/202 may be implemented as one or more CPU chips. The technical architecture further comprises input/output (I/O) devices 110/210, and network connectivity devices 112/212.

The secondary storage 104/204 is typically comprised of a memory card or other storage device and is used for non-volatile storage of data and as an over-flow data storage device if RAM 108/208 is not large enough to hold all working data. Secondary storage 104/204 may be used to store programs which are loaded into RAM 108/208 when such programs are selected for execution.

The secondary storage 104/204 has a processing component 114/214, comprising non-transitory instructions operative by the processor 102/202 to perform various operations of the method 60 according to various embodiments of the present disclosure. The ROM 106/206 is used to store instructions and perhaps data which are read during program execution. The secondary storage 104/204, the ROM 106/206, and/or the RAM 108/208 may be referred to in some contexts as computer-readable storage media and/or non-transitory computer-readable media. Non-transitory computer-readable media include all computer-readable media, with the sole exception being a transitory propagating signal per se.

The I/O devices 110/210 may include printers, video monitors, liquid crystal displays (LCDs), plasma displays, touch screen displays, keyboards, keypads, switches, dials, mice, track balls, voice recognizers, card readers, paper tape readers, and/or other well-known input devices.

The network connectivity devices 112/212 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (Wi-MAX), near field communications (NFC), radio frequency identity (RFID), and/or other air interface protocol radio transceiver cards, and other well-known network devices. These network connectivity devices 112/212 may enable the processor 102/202 to communicate with the Internet or one or more intranets. With such a network connection, it is contemplated that the processor 102/202 might receive information from the network, or might output information to the network in the course of performing the operations or steps of the method 60. Such information, which is often represented as a sequence of instructions to be executed using processor 102/202, may be received from and outputted to the network, for example, in the form of a computer data signal embodied in a carrier wave.

The processor 102/202 executes instructions, codes, computer programs, scripts which it accesses from hard disk, floppy disk, optical disk (these various disk based systems may all be considered secondary storage 104/204), flash drive, ROM 106/206, RAM 108/208, or the network connectivity devices 112/212. While only one processor 102/202 is shown, multiple processors may be present. Thus, while instructions may be discussed as executed by a processor, the instructions may be executed simultaneously, serially, or otherwise executed by one or multiple processors.

It should be appreciated that the technical architecture of the host server 100/client server 200 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture of the host server 100, client server 200, and/or mobile device 300, at least one of the CPU 102/202/302, the ROM 106/206/306, and the RAM 108/208/308 are changed, transforming the technical architecture in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by well-known design rules.

In the foregoing detailed description, embodiments of the present disclosure in relation to a method and system for controlling access to a facility according are described with reference to the provided figures. The description of the various embodiments herein is not intended to call out or be limited only to specific or particular representations of the present disclosure, but merely to illustrate non-limiting examples of the present disclosure. For example, the system 10, method 40, and method 60 may be extended to and for use in facilities 20 not mentioned herein, such as residences, dormitories, gateways, lifts/elevators, secure locations or private locations that require security measures, travel-related facilities (e.g. airport boarding gates, coaches, trains, etc.), or electronic access gates or devices. It should be appreciated that the system 10, method 40, and method 60 may be further extended to and for use in other different or distinct facilities 20 which may be physical or virtual, as would be readily apparent to and understood by the skilled person based on the present disclosure.

The present disclosure serves to address at least some of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A system for controlling access to a facility, the system comprising:
a host server comprising a processor and a memory configured to store computer-readable instructions, wherein when the instructions are executed, the processor is caused to:
receive access details of the facility from the facility, the access details communicated from a mobile device of a user located in front of the facility in a secured state for preventing access thereto, the access details being embedded in a quick response (QR) code displayed by the mobile device at a time when the mobile device is located in front of the facility, the QR code being refreshed at a defined frequency by a client server associated with the facility;
authenticate the access details in a first authentication process by comparing the received QR code with a current version of the QR code from the client server;
communicate a request notification to the mobile device in response to positive authentication of the access details from the first authentication process, the positive authentication comprising confirming that the mobile device is in front of the facility, the request notification comprising a request for biometric data of the user;
receive the biometric data inputted via the mobile device;
authenticate, by the host server, the biometric data in a second authentication process; and
change the facility from the secured state to an unsecured state in response to positive authentication of the biometric data from the second authentication process, thereby providing, to the user, access to the facility.

2. The system according to claim 1, wherein the facility includes an electronic device for maintaining the facility in the secured state and the access details are communicated from the mobile device to the electronic device of the facility based on the mobile device being located in front of the electronic device and the facility reverts to a secured state after a set period of time.

3. The system according to claim 1, wherein the access details include a dynamic identifier generated at a time of reservation of the facility for the user, the dynamic identifier including a timestamp generated at a time of confirmation of the reservation of the facility.

4. The system according to claim 1, wherein when the instructions are executed, the processor is further caused to authenticate the access details received from the facility against an access records database during the first authentication process.

5. The system according to claim 1, wherein when the instructions are executed, the processor is further caused to authenticate the biometric data received from the mobile device against a biometric database during the second authentication process.

6. The system according to claim 1, wherein the OR code is refreshed by synchronizing the QR code between the host server and the client server.

7. The system according to claim 1, further comprising performing a registration process prior to receiving the access details from the facility.

8. The system according to claim 7, the registration process comprising:
generating identifier data associated with a user account of the user, the identifier data including a media access control (MAC) address of the mobile device; and
receiving reference biometric data from the mobile device for the second authentication process, the reference biometric data associated with the user account.

9. The system according to claim 1, wherein authenticating the biometric data in the second authentication process comprises matching the biometric data with stored reference data based on a set of conditions defined by the host server and a stringency of the matching is adjusted by the host server based on characteristics of the facility.

10. A computerized method implemented on a mobile device of a user for controlling access to a facility, the method comprising:
communicating access details of the facility from the mobile device to the facility for a first authentication process, the mobile device located in front of the facility initially in a secured state for preventing access thereto, the access details being embedded in a quick response (QR) code displayed by the mobile device at a time when the mobile device is located in front of the facility, the QR code being refreshed at a defined frequency by a client server, wherein a host server is configured to authenticate the access details in a first authentication process by comparing the received QR code with a current version of the QR code from the client server;
receiving a request notification on the mobile device in response to positive authentication of the access details from the first authentication process, the request notification comprising a request for biometric data of the user, the positive authentication comprising confirming that the mobile device is in front of the facility;
receiving an input of the biometric data on the mobile device; and
communicating the biometric data from the mobile device to flail the host server for a second authentication process,
wherein the facility is configured to change from the secured state to an unsecured state in response to positive authentication, by the host server, of the biometric data from the second authentication process, thereby providing, to the user, access to the facility.

11. The method according to claim 10, wherein the facility includes an electronic device for maintaining the facility in the secured state and the access details are communicated from the mobile device to the electronic device of the facility based on the mobile device being located in front of the electronic device and the facility reverts from the unsecured state to a secured state after a set period of time.

12. The method according to claim 10, wherein the access details include a dynamic identifier generated at a time of reservation of the facility for the user, the dynamic identifier including a timestamp generated at a time of confirmation of the reservation of the facility.

13. The method according to claim 10, further comprising performing a registration process prior to communication of the access details to the facility.

14. The method according to claim 13, the registration process comprising:
generating identifier data associated with a user account of the user, the identifier data including a media access control (MAC) address of the mobile device;
receiving an input of reference biometric data associated with the user account on the mobile device; and
communicating the reference biometric data from the mobile device to the host server for the second authentication process.

15. The method according to claim 10, wherein the positive authentication of the biometric data from the second authentication process comprises matching the biometric data with stored reference data based on a set of conditions defined by the host server and stringency of the matching is adjusted by the host server based on characteristics of the facility.

16. The method according to claim 10, wherein the QR code is refreshed by synchronizing the QR code between the host server and the client server.

17. The method according to claim 10, wherein the access details are matched with stored records in the first authentication process.

18. The method according to claim 10, further comprising receiving, on the mobile device, a confirmation notification in response to the facility successfully changing from the secured state to the unsecured state.

19. A non-transitory computer-readable medium storing computer-readable instructions that, when executed, cause a processor of a host server to:
- receive access details of a facility from the facility, the access details provided by a mobile device of a user, the mobile device located in front of the facility in a secured state, the access details being embedded in a quick response (QR) code displayed by the mobile device at a time when the mobile device is located in front of the facility, the QR code being refreshed at a defined frequency by a client server associated with the facility;
- authenticate the access details in a first authentication process by comparing the received QR code with a current version of the QR code from the client server;
- communicate a request notification to the mobile device in response to positive authentication of the access details from the first authentication process, the positive authentication comprising confirming that the mobile device is in front of the facility, the request notification comprising a request for biometric data of the user;
- receive the biometric data inputted via the mobile device;
- authenticate, by the host server, the biometric data in a second authentication process; and
- change the facility from the secured state to an unsecured state in response to positive authentication of the biometric data from the second authentication process, thereby providing, to the user, access to the facility.

20. The system according to claim 1, wherein when the instructions are executed, the processor is further caused to perform a reservation process to book the facility.

* * * * *